United States Patent
Wang et al.

(10) Patent No.: US 10,323,329 B2
(45) Date of Patent: Jun. 18, 2019

(54) HIERARCHICALLY STRUCTURED, NITROGEN-DOPED CARBON MEMBRANES

(71) Applicant: King Abdullah University of Science and Technology, Thuwal (SA)

(72) Inventors: Hong Wang, Thuwal (SA); Tao Wu, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/767,488

(22) PCT Filed: Jan. 24, 2017

(86) PCT No.: PCT/IB2017/050362
§ 371 (c)(1),
(2) Date: Apr. 11, 2018

(87) PCT Pub. No.: WO2017/130101
PCT Pub. Date: Aug. 3, 2017

(65) Prior Publication Data
US 2018/0305827 A1 Oct. 25, 2018

Related U.S. Application Data

(60) Provisional application No. 62/286,605, filed on Jan. 25, 2016, provisional application No. 62/418,928, filed on Nov. 8, 2016.

(51) Int. Cl.
*C25B 1/04* (2006.01)
*B01D 67/00* (2006.01)
(Continued)

(52) U.S. Cl.
CPC .......... *C25B 1/04* (2013.01); *B01D 67/0067* (2013.01); *B01D 69/145* (2013.01);
(Continued)

(58) Field of Classification Search
CPC ........... B01D 2323/18; B01D 2323/30; B01D 2323/46; B01D 2325/022; B01D 2325/10;
(Continued)

(56) References Cited

U.S. PATENT DOCUMENTS

2014/0024521 A1  1/2014  Zelenay

FOREIGN PATENT DOCUMENTS

CN  103594680  2/2014

OTHER PUBLICATIONS

Jiayin Yuan et al.: "Ionic Liquid Monomers and Polymers as Precursors of Highly Conductive, Mesoporous, Graphitic Carbon Nanostructures" Chemistry of Materials, vol. 22, No. 17, Sep. 14, 2010 (Sep. 14, 2010), pp. 5003-5012.
Qiang Zhao et al.: "Hierarchically Structured Nanoporous Poly(Ionic Liquid) Membranes: Facile Preparation and Application in Fiber-Optic pH Sensing" Journal of the American Chemical Society, vol. 135, No. 15, Apr. 17, 2013 (Apr. 17, 2013), pp. 5549-5552.
(Continued)

*Primary Examiner* — John Kim
(74) *Attorney, Agent, or Firm* — Patent Portfolio Builders PLLC

(57) ABSTRACT

The present invention is a structure, method of making and method of use for a novel macroscopic hierarchically structured, nitrogen-doped, nano-porous carbon membrane (HNDCMs) with asymmetric and hierarchical pore architecture that can be produced on a large-scale approach. The unique HNDCM holds great promise as components in separation and advanced carbon devices because they could offer unconventional fluidic transport phenomena on the nanoscale. Overall, the invention set forth herein covers a hierarchically structured, nitrogen-doped carbon membranes and methods of making and using such a membranes.

20 Claims, 34 Drawing Sheets

(51) Int. Cl.
| | |
|---|---|
| *B01D 69/14* | (2006.01) |
| *B01D 71/02* | (2006.01) |
| *C08L 33/02* | (2006.01) |
| *C08L 79/08* | (2006.01) |
| *B01J 20/20* | (2006.01) |
| *B01J 21/18* | (2006.01) |
| *B01J 35/06* | (2006.01) |
| *H01M 4/90* | (2006.01) |
| *B01J 35/00* | (2006.01) |

(52) U.S. Cl.
CPC ............ *B01D 71/021* (2013.01); *B01J 20/20* (2013.01); *B01J 21/18* (2013.01); *B01J 35/065* (2013.01); *C08L 33/02* (2013.01); *C08L 79/08* (2013.01); *H01M 4/9083* (2013.01); *B01D 2323/18* (2013.01); *B01D 2323/30* (2013.01); *B01D 2323/46* (2013.01); *B01D 2325/022* (2013.01); *B01D 2325/10* (2013.01); *B01D 2325/34* (2013.01); *B01J 35/0033* (2013.01); *Y02E 60/366* (2013.01)

(58) Field of Classification Search
CPC ............ B01D 2325/34; B01D 67/0067; B01D 69/145; B01D 71/021; B01J 35/0033; B01J 35/065; B01J 21/18; B01J 20/20; C08L 33/02; C08L 79/08; C25B 1/04; H01M 4/9083; Y02E 60/366
See application file for complete search history.

(56) References Cited

OTHER PUBLICATIONS

Yanqin Yang et al.: "Preparation and characterization of porous polyelectrolyte complex membranes for nanofiltration" RSC Advances, vol. 5, No. 5, Dec. 5, 2014 (Dec. 5, 2014), pp. 3567-3573.
Yingzhi Li et al.: "Nitrogen-Doped Carbon Membrane Derived from Polyimide as Free-Standing Electrodes for Flexible Supercapacitors" SMALL, vol. 11, No. 28, Mar. 19, 2015 (Mar. 19, 2015), pp. 3476-3484, XP055364602, DE ISSN: 1613-6810.
International Search Report and Written Opinion for PCT/IB2017/050362, dated Apr. 13, 2017.
Chen, Z., et al., "Three-Dimensional Flexible and Conductive Interconnected Graphene Networks Grown by Chemical Vapour Deposition," Nature Materials, Letters, Apr. 10, 2011, vol. 10, pp. 424-428.
Gong, K., et al., "Nitrogen-Doped Carbon Nanotube Arrays with High Electrocatalytic Activity for Oxygen Reduction," Science, Feb. 6, 2009, vol. 323, pp. 760-764.
Kroto, H.W., "The Stability of the Fullerenes Cn, with n-24, 28, 32, 36, 50, 60 and 70," Nature, Oct. 8, 2987, vol. 329, pp. 529-531.
Oh, S.H., et al., "Synthesis of a Metallic Mesoporous Pyrochlore as a Catalyst for Lithium-O2 Batteries," Nature Chemistry, Articles, Nov. 23, 2012, vol. 4, pp. 1004-1010.
Peng, H., et al., "Vertically Aligned Peral-Like Carbon Nanotube Arrays for Fiber Spinning," Journal of the American Chemical Society, Jan. 3, 2008, vol. 130, pp. 1130-1131.
Zhang, J., et al., "A Metal-Free Bifunctional Electrocatalyst for Oxygen Reduction and Oxygen Evolution Reactions," Nature Nanotechnology, Letters, Apr. 6, 2015, vol. 48.

$$DEC = X/X+Y \qquad (1)$$

$$DEC = 482S\text{-}64/287S\text{-}64 \qquad (2)$$

HIERARCHICALLY STRUCTURED, NITROGEN-DOPED CARBON MEMBRANES

CROSS-REFERENCE TO RELATED APPLICATIONS

This application is the National Stage of International Application No. PCT/IB2017/050362 filed Jan. 24, 2017, which claims the benefit of U.S. Provisional Patent Application Ser. No. 62/286,605 filed Jan. 25, 2016 and U.S. Provisional Patent Application Ser. No. 62/418,928 filed Nov. 8, 2016.

TECHNICAL FIELD

The present invention relates to a method of making and using hierarchically structured, nitrogen-doped carbon membranes.

BACKGROUND OF THE INVENTION

Typical carbon membrane synthesis methods known in the prior art involve mechanical rolling of thermally expanded graphite flakes, chemical vapor deposition, as well as vacuum filtration of graphene sheets or carbon nanotubes solution. In these methods used to date, it is difficult to realize large-scale production of CMs with well-defined pore architectures and controlled morphologies. These are long-felt problems in the field that are unresolved.

When used in electron microscopy, carbon membranes have been known to be produced as either a continuous film, such as in graphene layers or amorphous carbon films, or perforated in patterned or random geometries to leave open spaces in the membrane. The membranes, ranging in thickness from a single atomic layer (graphene) up to 250 nm or more, are typically supported on a grid-form made from Cu or Ni with apertures. However, carbon is a relatively inert substrate, so sample preparation often involves glow-discharge cleaning to improve wettability. Carbon membranes also have no active surface to create an affinity for a particular material.

Carbon materials have also been widely researched in their use in addressing global energy and environmental issues due to their tunable physicochemical properties, rich abundance, and low cost. Morphology control of carbon materials at atomic/nano/micro-sized scales is highly important from the view of practical applications, but these problems with morphology control are long-felt, unresolved issues. For instance, various shapes and morphologies of carbons, such as carbon quantum dot fibers, nanospheres, vesicles, and membranes have been proposed to be developed, and among these morphologies are macroscopic free-standing porous carbon membranes (CMs), but theses shapes and morphologies continue to encounter precision and control problems.

Existing methods known in the prior art have not supported precise control over morphology, pore architecture, or bottom-up production approaches, which has continued to hinder the advanced applications of freestanding carbon membranes (CMs), particularly in the fields of nanotechnology and carbon nanoelectronics. Continuing problems exist in the prior art regarding achievement of hierarchical pore architectures possessing interconnected pores over different length scales from micro- to meso- and to macropores, which have hindered the ability to offer rapid mass/energy transport through large pores and simultaneously high reaction capacity through the large active surface area provided by nanopores. In spite of tremendous efforts in recent years to synthesize hierarchically structured porous carbon membranes, all these difficulties have persisted to plague the technological field without a solution, including the failure to solve the problems associated with structural complexity, multistep templating reactions or post-processing of carbon membranes.

SUMMARY OF THE INVENTION

The present invention is a structure, method of making and method of use for a novel macroscopic hierarchically structured, nitrogen-doped, nano-porous carbon membrane (HNDCMs) with asymmetric and hierarchical pore architecture that can be produced on a large-scale approach. The unique HNDCM holds great promise as components in separation and advanced carbon devices because they could offer unconventional fluidic transport phenomena on the nanoscale.

Provided herein is a commercial-scale, bottom-up approach to fabricate large-sized, freestanding nanoporous carbon membranes that possess nitrogen doping and hierarchical pore architectures, and optional surface functionalization within the pores. The membrane is composed of three-dimensionally interconnected mixed micro-/meso-/macropores, which can be finely tailored by the polymer precursor (e.g., poly(acrylic acid)) of different molar masses.

The membranes set forth in the present invention can be used as electrode materials for fuel cell, battery, supercapacitor, and electrocatalysis, used for separation; or as carrier materials. In addition, the bottom-up approach allows for facile functionalization of carbon membranes by modifying the precursor component. As an example, carbon membranes were loaded with cobalt nanoparticles, which serve as highly active bifunctional electrochemical catalyst for overall water splitting. As a further example, carbon membranes were functionalized with Janus-type Co/CoP nanocrystals, which serve to promote overall water splitting in acidic and alkaline conditions.

For potential advanced applications of freestanding carbon membranes (CMs), particularly in the fields of nanotechnology and carbon nanoelectronics, the present invention supports precise control over the morphology as well as the pore architecture from a bottom-up approach. The present invention can achieve hierarchical pore architectures possessing interconnected pores over different length scales from micro- to meso- and to macropores, which means the present invention can solve prior problems associated with offering rapid mass/energy transport through large pores and simultaneously high reaction capacity through the large active surface area provided by nanopores. The present invention supports the synthesis of hierarchically structured porous carbon membranes, and solves the persistent problems associated with structural complexity, multistep templating reactions or post-processing of carbon membranes.

Macroscopic free-standing nanoporous carbon membranes shown and described herein provide chemical composition and hierarchical pore architectures that are very valuable in both fundamental science and industry because they offer exceptional performances in some applications that go beyond conventional carbon powders. The present invention will also allow further research in nanoporous carbon membranes and their widespread use by expanding the availability of carbon membranes and overcoming known synthesis challenges.

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which:

FIG. 1A is a schematic illustration of the preparation procedure.

FIG. 1B is a photograph of a 7.2×3.3 cm$^2$ freestanding gradient porous polymer membrane (GPPM).

FIG. 1C is a photograph of a 5.2×2.5 cm$^2$ freestanding HNDCM obtained by pyrolysis of GPPM in B.

FIG. 1D is a cross-section scanning electron microscope (SEM) image of the HNDCM-100,000-1000.

FIG. 1E is a SEM image of the cross section of the porous HNDCM-250,000-1000 and FIGS. 1F, 1G and 1H are high magnification SEM images of the cross-section structures of HNDCM-250,000-1000, the scale bars are 500 nm.

(FIG. 3A) N$_2$ absorption-desorption isotherms and (FIG. 3B) corresponding pore size distribution of HNDCM-100,000-1000/900/800. (FIG. 3C) Temperature dependence of conductivity measured for HNDCM-100,000-1000/900/800 from 5 K to 390 K using a four-probe method; (FIG. 3D) Comparison of the conductivity of HNDCM-100,000-1000 with other reports on macroscopic carbon materials, e.g. carbon nanotube fiber (Peng et al., J. Am. Chem. Soc. 130, 1130-1131 (2008)), graphene paper (Park et al., Nat. nanotech. 4, 217-224 (2009)), carbon membrane (Matsushita et al., J. Am. Chem. Soc. 137, 9077-9087 (2015)) and graphene foam (Chen et al., Nat. Mater. 10, 424-428 (2011)).

(FIG. 4A) Cross-section SEM image, (FIG. 4B) High magnification SEM image, (FIG. 4C) TEM image of HNDCM-100,000-1000/Co. (FIGS. 4D, 4E and 4F) Hydrogen evolution reaction (HER) and oxygen evolution reaction (OER) performances in 1 M KOH.

FIG. 16A is a cross-section SEM image of GPPM-450,000; inset is the enlarged SEM image.

FIGS. 16B-16E are representative SEM images of the cross-sectional structures of HNDCM-450,000-1000.

FIG. 17A is a cross-sectional SEM image of GPPM-3,000,000; inset is the enlarged SEM image.

FIGS. 17B-17C are representative SEM images of the cross-sectional structures of HNDCM-3,000,000-1000.

FIGS. 25A-25B are graphs showing x-ray photoelectron spectroscopy (XPS) data.

FIG. 25A is a graph showing XPS spectra of HNDCM-100,000-y (y=800, 900, 1000).

FIGS. 25B-25D are graphs showing the fitted XPS peaks for N1s orbit of HNDCM-100,000-y (y=800, 900, 1000).

FIG. 35A shows the porous polymer membrane; FIG. 35B shows the nitrogen-doped porous carbon membranes functionalized with Co/CoP Janus nanocrystals.

FIG. 36A is a low magnification image, FIGS. 36B and 36C are higher magnification images.

FIG. 40B is a graph of the Gibbs free energy profile of the HER.

Figures 1A, 1B, 1C, 1D, 1E, 1F, 1G, 1H:
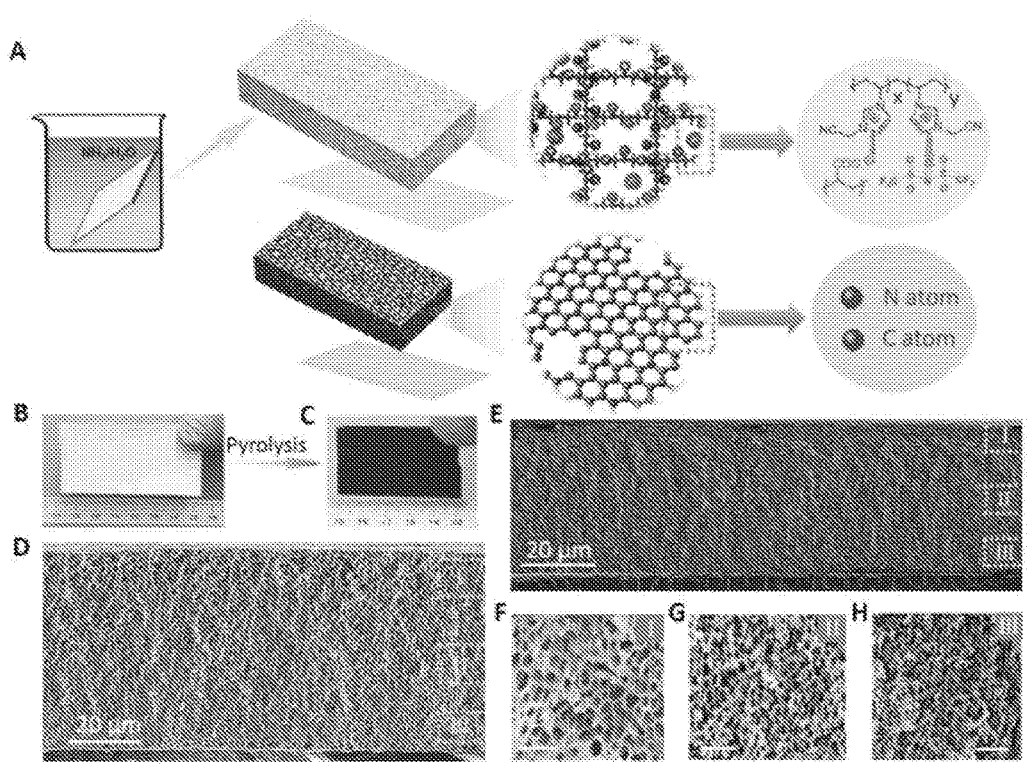
FIGS. 1A-1H show the formation and structure of hierarchically structured nitrogen-doped nanoporous carbon membranes (HNDCMs).

While the invention is susceptible to various modifications and alternative forms, specific embodiments thereof have been shown by way of example in the drawings and are herein described in detail. It should be understood that the description herein of specific embodiments described herein are not intended to limit the invention to the particular forms disclosed. On the contrary, the claimed invention is meant to cover all modifications, equivalents, and alternatives falling within the spirit and scope of the invention as defined by the appended claims and described herein.

DETAILED DESCRIPTION

The present invention is a structure, method of making and method of use for a novel macroscopic hierarchically structured, nitrogen-doped, nanoporous carbon membrane (HNDCMs) with asymmetric and hierarchical pore architecture that can be produced on a large-scale approach. The unique HNDCM holds great promise as components in separation and advanced carbon devices because they could offer unconventional fluidic transport phenomena on the nanoscale.

Provided herein is a commercial-scale, bottom-up approach to fabricate large-sized, freestanding nanoporous carbon membranes that possess nitrogen doping and hierarchical pore architectures, and optional surface functionalization within the pores. The membrane is composed of three-dimensionally interconnected mixed micro-/meso-/macropores, which can be finely tailored by the polymer precursor (e.g., poly(acrylic acid)) of different molar masses.

The membranes set forth in the present invention can be used as electrode materials for fuel cell, battery, supercapacitor, and electrocatalysis, used for separation; or as carrier materials. In addition, the bottom-up approach allows for facile functionalization of carbon membranes by modifying the precursor component. As an example, carbon membranes were loaded with cobalt nanoparticles, which serve as highly active bifunctional electrochemical catalyst for overall water splitting. As a further example, carbon membranes were functionalized with Janus-type Co/CoP nanocrystals, which serve to promote overall water splitting in acidic and alkaline conditions.

Figure 5:
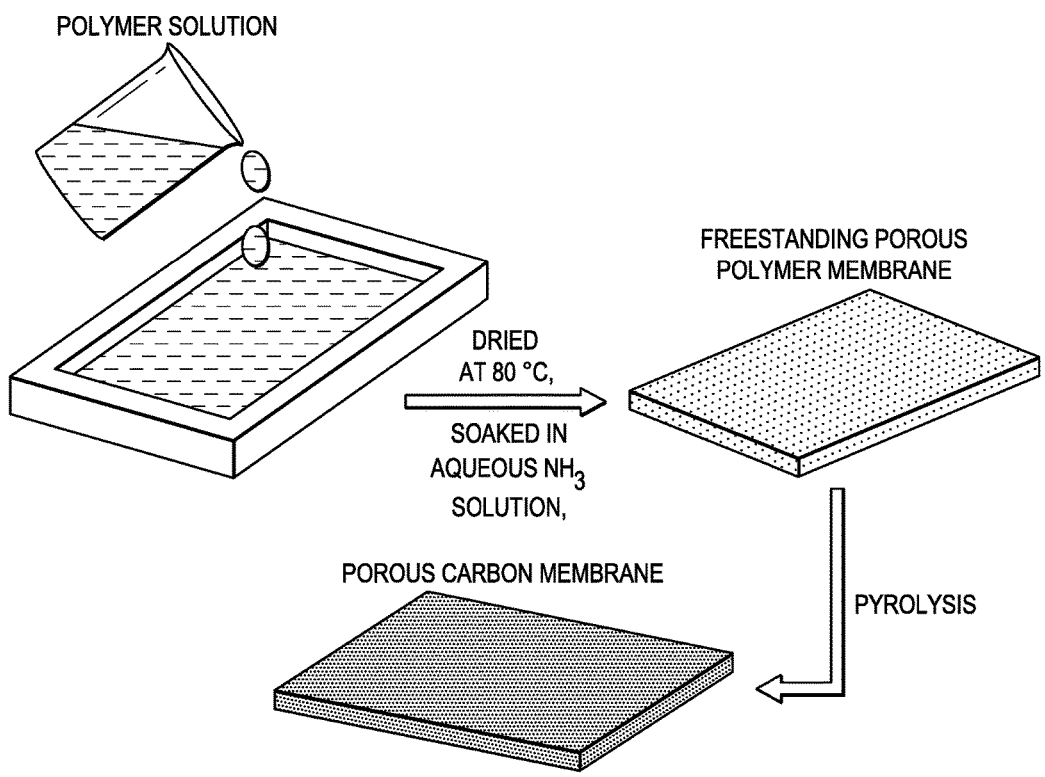
FIG. 5 is a schematic illustration of preparation of hierarchical porous polymer membrane and carbon membrane.
Figure 6:
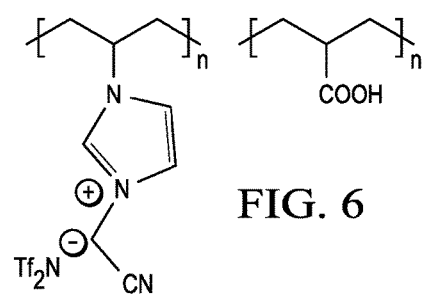
FIG. 6 shows the chemical structures of poly[1-cyanomethyl-3-vinylimidazolium bis(trifluoromethanesulfonyl)imide] (PCMVImTf$_2$N) (left) and poly(acrylic acid) (PAA) (right).
Figure 7:
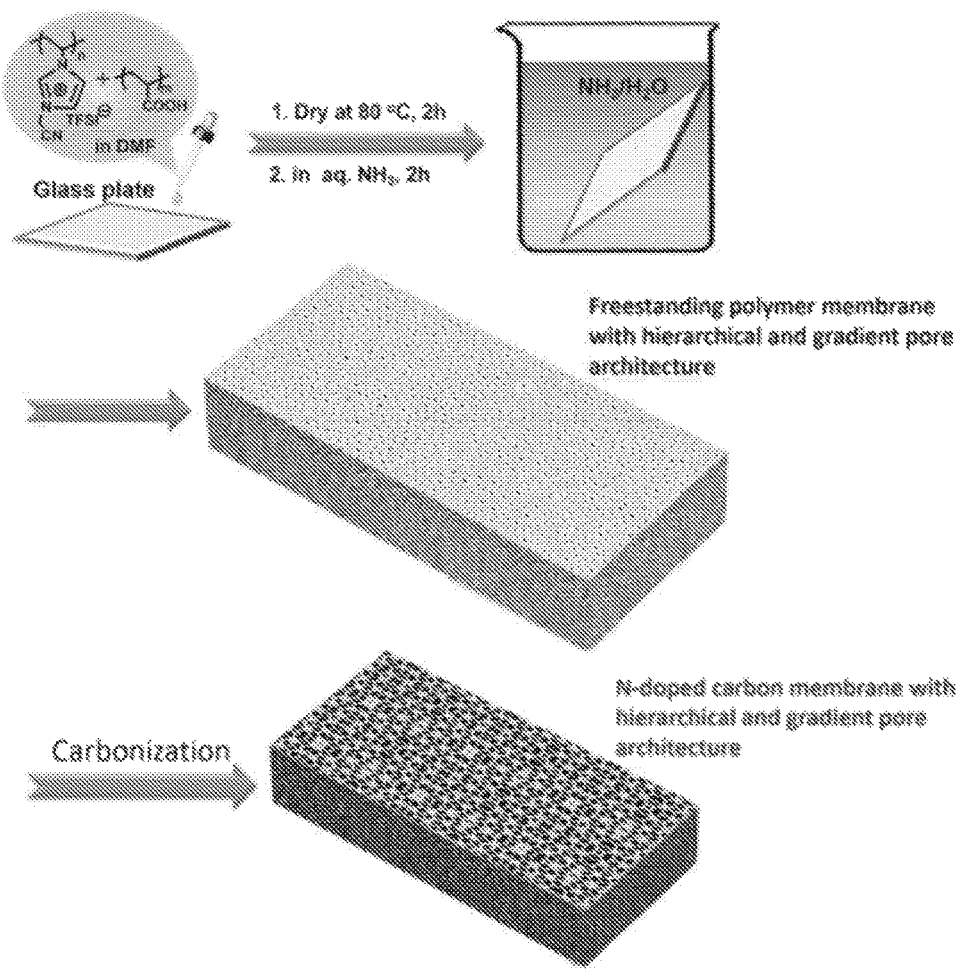
FIG. 7 is a schematic illustration showing the preparation of HNDCMs. First, GPPMs can be obtained from a solution mixture of a cationic PCMVImTf$_2$N and PAA in DMF. Afterwards, direct pyrolysis of the GPPM leads to the corresponding HNDCM.

Provided herein is a method of making a hierarchically structured, nitrogen-doped carbon membrane. For exemplary methods and components, see FIGS. 5, 6, and 7. The apparatus used in this method of production has polymer synthetic equipment, glass substrate and a furnace.

This method of production described herein includes pouring onto a substrate a polymer solution comprising poly[1-cyanomethyl-3-vinylimidazolium bis(trifluoromethanesulfonyl) imide] (PCMVImTf$_2$N) and poly(acrylic acid) (PAA) in a dimethyl formamide or dimethylsulfoxide solution to form a sheet. The sheet is then dried to form a gradient porous polymer membrane (GPPM). Various methods of preparation of GPPMs are known in the art and could be used. The GPPM is then contacted with an ammonium hydroxide aqueous solution (e.g., by soaking in the solution for 1-36 hours or any amount in between) and pyrolyzed (e.g., at a temperature of about 500° to 1500° C. or any amount in between) in the presence of nitrogen to form the hierarchically structured, nitrogen-doped carbon membrane. As used throughout, notations of GPPM-x and HNDCM-x-y are used, wherein x and y denote the molecular weight of PAA, for example, and the carbonization temperature, respectively. These two crucial parameters are varied to prepare membranes with desirable characteristics as shown below in the Examples.

The present method of production can be described, alternatively, as follows. A method of making a hierarchically structured, nitrogen-doped carbon membrane, the method comprising the steps of: (a) pouring onto a substrate a polymer solution comprising poly[1-cyanomethyl-3-vinylimidazolium bis(trifluoromethanesulfonyl) imide] (PCMVImTf$_2$N) and poly(acrylic acid) (PAA) in a dimethyl formamide solution to form a sheet; (b) drying the sheet to form a gradient porous polymer membrane; (c) contacting the gradient porous polymer membrane with an ammonium hydroxide aqueous solution; and (d) pyrolyzing the gradient porous polymer membrane of step (c) in the presence of nitrogen to form the hierarchically structured, nitrogen-doped carbon membrane. A drying step can be performed at a temperature of 80° C. to 120° C., or performed for 1 to 20 hours.

In this method, the molecular weight of the PAA is from 2,000 g/mol to 3,000,000 g/mol, the molecular weight of the PAA is from 2000 g/mol to 450,000 g/mol, or the molecular weight of the PAA is from 100,000 g/mol to 450,000 g/mol. In this method, the molecular weight of PCMVImTf$_2$N is from 22,000 g/mol to 100,000 g/mol.

The present method can also be performed by providing contact with a gradient porous polymer membrane with a metallic salt aqueous solution, and the metallic salt aqueous solution comprises Co, Fe, Ni, Cr or Ge. Alternatively, the contacting step can include the step of soaking the gradient porous polymer membrane in the ammonium hydroxide for one to 36 hours, or the pyrolysis step and be performed at a temperature of 500° C. to 1500° C.

The present invention can also be performs using the steps of: refluxing the gradient porous polymer membrane in an aqueous cobalt acetate solution; rinsing; and drying the refluxed gradient porous polymer membrane prior to the pyrolysis step; and phosphatizing the Co-containing membrane in the presence of monosodium phosphate (NaH$_2$PO$_4$) and nitrogen to form a functionalized nanoporous carbon membrane comprising Co/CoP Janus-type nanocrystals after the pyrolysis step. And, the can be performed for about 12 to about 36 hours, and the phosphatization step is performed at a temperature of about 175° C. to about 525° C.

The claimed invention covers the nanoporous carbon membrane made by the process described herein, and such a membrane would include: a nitrogen-doped gradient porous polymer membrane with a hierarchical pore architecture, wherein the polymer comprises poly[1-cyanomethyl-3-vinylimidazolium bis(trifluoromethanesulfonyl) imide] (PCMVImTf$_2$N) and poly(acrylic acid) (PAA) and wherein the pores are interconnected and gradually decrease in size from a first surface of the membrane to a second surface of the membrane.

The nanoporous carbon membrane described above can also include a metal catalyst, where the metal catalysts are selected from the group consisting of Co, Fe, Ni, Cr, Ge—such a membrane would have a high conductivity. Moreover, the nanoporous carbon membrane described above can functionalize the membrane with Co/CoP Janus nanocrystals.

As an alternative to poly[1-cyanomethyl-3-vinylimidazolium bis(trifluoromethanesulfonyl) imide], the polymer solution can comprise any polymer containing a hydrophobic anion. Optionally, the polymer comprises hexafluorophosphate (PF$_6$), tetrafluoroborate (BF$_4$) or bis(trifluoromethylsulfonyl)imide (Tf$_2$N). Examples of polymers containing hexafluorophosphate (PF$_6$) include, but are not limited to, poly[(4-vinylbenzyl)trimethylammonium hexafluorophosphate], poly[1-(4-vinylbenzyl)-3-butylimidazolium hexafluorophosphate, poly[1-(4-vinylbenzyl)trimethylammonium hexafluorophosphate, phyllo-poly[[silver (I)-di-µ2-4-aminomethylpyridineκ2N:N'] hexafluorophosphate], poly(methyl methacrylate)-1-butyl-3-methylimidazolium hexafluorophosphate, and poly(l-butyl-2,3-dimethyl-4-vinylimidazolium hexafluorophosphate). Polymers containing tetrafluoroborate (BF$_4$) include, but are not limited to, poly[1-(4-vinylbenzyl)-4-methylimidazolium tetrafluoroborate, poly(1-vinyl-3-methylimidazolium tetrafluoroborate), poly-1-(4-vinylbenzyl)-3-methylimidazolium tetrafluoroborate], poly (1-butyl-3-methylimidazolium tetrafluoroborate), poly[(4-vinylbenzyl)trimethylammonium tetrafluoroborate], and poly[1-(4-vinylbenzyl)-3-butylimidazolium tetrafluoroborate. Polymers containing bis(trifluoromethylsulfonyl)imide ($Tf_2N$) include, but are not limited to, poly[(4-vinylbenzyl) trimethylammonium trifluoromethanesulfonamide, poly (ethylene oxide)-lithium bis(trifluoromethanesulfonyl) imide-N-butyl-N-methylpyrrolidinium bis (trifluoromethanesulfonyl)imide, cellulose acetate-lithium bis(trifluoromethyl-sulfonyl)imide, poly([1-vinyl-3-hexylimidazolium] [bis(trifluoromethylsulfonyl)imide]), and poly(1-(2-methacryloyloxy)ethyl-3-butylimidazolium bis (trifluoromethanesulfonyl)imide).

As an alternative to PAA, other polymers can be used. Suitable polymers include, but are not limited to, sodium polyacrylate, poly(ethyl acrylate), poly(methyl acrylate), poly(methyl methacrylate), polyacrylamide, poly(methacrylic acid), poly(methylmethacrylic acid), poly(hydroxymethyl acrylate), poly(hydroxymethyl methacrylate), poly(vinylpyrollidone), polystyrene, polystyrene sulfuric acid, polyacrylonitrile, polyvinylidene fluoride, polytetrafluoroethylene, polyethylene oxide, polypropylene, polypropylene oxide, polyphosphazene, polysiloxane, polyvinyl fluoride, polyvinyl acetate, polyvinyl alcohol, polycarbonate, poly (ethacrylic acid), poly (propylacrylic acid), poly (isopropylacrylic acid), poly (crotonic acid), poly (maleic acid), poly (itaconic acid), poly (fumaric acid), polyvinyl alcohol, gelatin, gum Arabic, hydroxyethyl cellulose, cellulose acetate, cellulose acetate butyrate, polyvinyl pyrrolidine, casein, starch, polyvinyl chloride, copoly(styrene-anhydrous maleic acid), copoly(styrene-acrylonitrile), copoly (styrene-butadiene), polyvinyl acetal, polyester, polyurethane, phenoxy resin, polyvinylidene chloride, polyepoxide, polyvinyl acetate, cellulose ester, polyamide, poly (alkyl acrylate), poly (alkyl methacrylate), polyvinyl acetamide, poly-2-acrylamide-2-methylpropane sulfonic acid, polyethylene, polyethylene glycol, dextrin, carboxymethyl cellulose, methyl cellulose, ethyl cellulose, glutathione, polydivinyl benzene, polysaccharide, polyolefin, polyisobutylene, polybutylmethacrylate, polycrotonic acid, polymaleic acid, and polyaspartate.

Optionally, the drying step is performed at a temperature of 80° to 120° C. Optionally, the drying step is performed for 1 to 20 hours. Also, optionally, the concentration of ammonium water is ranged from 0.1% to 25%.

The molecular weight of the polymer is varied to control the pore size and structure. PAA, for example, is a cross-linker that chemically lock $PCMVImTf_2N$ in a porous network via electrostatic complexation. By way of example, the molecular weight of PAA is from about 2,000 to 3,000,000 g/mol, from about 2000 to 450,000 g/mol, from about 100,00 to 450,000 g/mol or any value in between. Optionally, the polymer polyacrylonitrile or poly(acrylamide-co-acrylic acid) can be used. By way of example, the molecule weight of $PCMVImTf_2N$ is selected from 22,000 g/mol to 100,000 g/mol. PAA and $PCMVImTf_2N$ are exemplary throughout and other polymer pairs can be used similarly.

Optionally, the membrane is further functionalized with polyelectrolyte-derived complexes that bind and immobilize metal ions, salts, and nanoparticles. This bottom-up approach allows for facile functionalization of HNDCMs, for example, with metal nanoparticles via doping polymeric precursors with metal species. By way of example, the membranes described herein can be used for creation of renewable, clean energy carriers like Hz. The apparatus used in the creation of energy carriers using the present carbon membrane has an electric power source such as a solar cell or electrochemical cell. The steps involved with the method of creating energy carriers using this novel carbon membrane include: (1) preparing the carbon membrane with desired pore sizes as described above, (2) building up electrochemical cell, (3) providing the reaction media, including alkaline and acid and neutral solutions, and (4) using this carbon membrane as working electrode to produce desired energy carriers.

The scalable and sustainable production of Hz through electrochemical water splitting requires highly efficient, robust earth-abundant electrocatalyst materials to replace costly Pt catalysts. Hydrogen evolution reaction (HER) or oxygen evolution reaction (OER) electrocatalysts have been applied in water splitting. Both efficient HER and OER are crucial for the overall efficiency of water splitting. The apparatus using HER and OER with this novel carbon membrane has an electric power source, such as an electrochemical cell. The steps involved with this method of water splitting using this novel carbon membrane include: (1) preparing the carbon membrane with desired pore sizes as described above, (2) building up electrochemical cell, (3) providing the reaction media, including alkaline and acid solutions, and (4) using this carbon membrane as working electrode driven by electric power to produce hydrogen and oxygen.

However, separate catalysts were generally required, as HER electrocatalysts work efficiently in strong acidic conditions and OER electrocatalysts work in alkaline medium. In one aspect, the present technology allows for use of bifunctional electrocatalysts for both OER and HER. Thus, the nanoporous carbon membrane optionally includes a functional group, such as a metal (such as a Co, Fe, Ni, Cr, Ge) or other functional or bifunctional catalyst.

By way of example, the method (of water splitting) further includes contacting the gradient porous polymer membrane with a metallic salt aqueous solution such as a solution containing Co, Fe, Cu, Ni, Pt, Au, Cr or Ge. For example, the metallic salt solution can comprise $CuCl_2$, $CoCl_2$, $FeCl_3$, $H_2PtCl_6$, $HAuC_{14}$ and the like. In a further aspect, the present technology allows for use of functionalized nanoporous carbon membranes for HER in either acidic or alkaline conditions. The apparatus used in the method of water splitting using the present carbon membrane has an electric power source such as a solar cell, electrochemical cell and reaction media such as alkaline and acid solutions. The steps involved with the method of water splitting using this novel carbon membrane include the steps of: (a) nitrogen-doped gradient porous polymer membrane with a hierarchical pore architecture, wherein the polymer comprises poly[1-cyanomethyl-3-vinylimidazolium bis(trifluoromethanesulfonyl) imide] ($PCMVImTf_2N$) and poly(acrylic acid) (PAA) and wherein the pores are interconnected and gradually decrease in size from a first surface of the membrane to a second surface of the membrane; and a single metal catalyst. In this method, the metal catalyst can be cobalt, and the electrochemical splitting of water occurs under alkaline conditions or occurs under acidic conditions. The electrochemical process of splitting water using the claimed membrane includes functionalizing the membrane with Co/CoP Janus nanocrystals, and also includes the electrochemical splitting of water using a hydrogen evolution reaction (HER) and/or an oxygen evolution reaction.

Thus, the nanoporous carbon membrane optionally includes bifunctional Janus-type nanocrystals (such as Co/CoP) or other bifunctional or functional nanocrystals. For further functionalization of the membrane to include Janus-type nanocrystals, the method further includes refluxing the nanoporous carbon membrane in an aqueous cobalt acetate solution, rinsing and drying the refluxed nanoporous carbon prior to the pyrolysis step and, after the pyrolysis step, phosphatizing the Co-containing membrane in the presence of monosodium phosphate ($NaH_2PO_4$) and nitrogen to form a functionalized nanoporous carbon membrane comprising Co/CoP Janus-type nanocrystals. By way of example, the refluxing step is performed for 12-36 hours or any amount of time within the range. By way of example, the phosphatization step is performed at 175-325° C. or at any temperature within the range.

Provided herein are also membranes made by the provided methods. Using versatile, large-scale synthetic strategies, highly graphitic, hierarchically structured, asymmetric, porous, nitrogen-doped carbon membranes are prepared. The apparatus used in the creation of energy carriers using the present carbon membrane has an electric power source such as a solar cell or an electrochemical cell. The steps involved with the method of creating energy carriers using this novel carbon membrane include: (1) preparing the carbon membrane with desired pore sizes as described above, (2) building up electrochemical cell, (3) providing the reaction media such as alkaline and acid and neutral solutions, and (4) using this carbon membrane as working electrode driven by electric power to produce desired energy carriers.

The unique porous structure of polymeric precursors affords a high degree of graphitization of the carbon membrane, thus leading to graphitic nitrogen-doped porous carbon at a pyrolysis temperature as low as 900° C. After being loaded with cobalt nanoparticles, for example, such carbon membranes with unique morphology and ultrahigh conductivity were directly utilized as a bifunctional catalyst for overall water splitting, achieving record high electrolyzer efficiency. After being loaded with Co/CoP Janus-type nanocrystals, for example, such carbon membranes with unique functionalization were directly utilized as a bifunctional catalyst for overall water splitting, achieving high electrolyzer efficiency.

For example, provided is a nanoporous carbon membrane comprising a nitrogen-doped gradient porous polymer membrane with a hierarchical pore architecture, wherein the polymer comprises poly[1-cyanomethyl-3-vinylimidazolium bis(trifluoromethanesulfonyl) imide] ($PCMVImTf_2N$) and poly(acrylic acid) (PAA) and wherein the pores are interconnected and gradually decrease in size from a first surface of the membrane to a second surface of the membrane. Optionally, the pore walls in such carbon membranes (CMs) show a single-crystal-like characteristic. Optionally, the nanoporous carbon membrane is functionalized with Janus nanoparticles (e.g., Co/CoP Janus nanoparticles).

Optionally, the membrane is designed to provide high conductivity. Generally, the conductivity of carbon materials prepared under 1000° C. is below 1 S/cm due to its amorphous nature. As used herein, the term high conductivity means a conductivity of 10 S/cm or greater. By way of example, the herein provided membranes have conductivities of 30-200 S/cm. The apparatus used to provide high conductivity using the present carbon membrane has a physical property measurement system that uses a four-probe method. The steps involved with the method of providing high conductivity using this novel carbon membrane include: (1) preparing the carbon membrane with desired pore sizes as described above, (2) fixing a rectangle of the carbon membrane in physical property measurement system, (3) applying probes, and (4) using a four-probe method to produce the conductivity.

Also provided is a method of producing hydrogen (e.g., for uses as a fuel) using the present nanoporous carbon membranes with a single bifunctional catalyst (e.g., a metal catalyst like cobalt). The method comprises, by way of example, electrochemically splitting water in an alkaline media with a single bifunctional catalyst that catalyzes both a hydrogen evolution reaction and an oxygen evolution reaction. The apparatus used in the production of hydrogen using the present carbon membrane has an electric power source such as an electrochemical cell or a solar cell. The steps involved with the method of producing hydrogen using this novel carbon membrane include: (1) preparing the carbon membrane with desired pore sizes as described above, (2) building up electrochemical cell, (3) providing the reaction media such as alkaline and acid solutions, and (4) directly using this carbon membrane as working electrode driven by electric power to produce H2.

Also provided is a method of producing hydrogen (e.g., for uses as a fuel) using the present nanoporous carbon membranes with bifunctional nanocrystals (e.g., Co/CoP nanocrystals). The method comprises, by way of example, electrochemically splitting water in either alkaline or acidic media with a single bifunctional membrane that catalyzes a hydrogen evolution reaction (HER). The apparatus used in the production of hydrogen using the present carbon membrane with bifunctional nanocrystals has an electric power source such as electrochemical cells or a solar cell. The steps involved with the method of producing hydrogen using this novel carbon membrane with bifunctional nanocrystals include: (1) preparing the carbon membrane with desired pore sizes as described above, (2) building up electrochemical cell, (3) providing the reaction media including alkaline and acid solutions, and (4) directly using this carbon membrane as working electrode driven by electric power to produce H2.

Optionally, the method further comprises an oxygen evolution reaction (OER). The apparatus used in the oxygen evolution reaction (OER) using the present carbon membrane has an electric power source such as an electrochemical cell or solar cell. The steps involved with the method of conducting an oxygen evolution reaction (OER) using this novel carbon membrane include: (1) preparing the carbon membrane with desired pore sizes as described above, (2) building up electrochemical cell, (3) providing the reaction media (alkaline solution), and (4) directly using this carbon membrane as working electrode driven by electric power to produce O2.

Also provided is a method of performing mass separation or energy production using the present nanoporous carbon membranes, with or without a functional group. The apparatus used to perform mass separation or energy production using the present carbon membrane has electro-assist separation equipment. The steps involved with the method of performing mass separation or energy production using this novel carbon membrane include: (1) preparing the carbon membrane with desired pore sizes as described above, (2) fixing the carbon membrane inside the electro-assist separation equipment, and, then, (3) performing the mass separation operation.

Also provided herein is a fire-retardant protective material made by the methods described herein. The fire-retardant material comprises the one or more carbon membranes as described herein. The apparatus used to make fire-retardant protective materials using the present carbon membrane has spin-coating equipment. The steps involved with the method of making fire-retardant protective materials using this novel carbon membrane include: (1) spin-coating of polymer membrane on desired substrates, and then (2) preparing the carbon membrane as described above.

Publications cited herein and the material for which they are cited are hereby specifically incorporated by reference in their entireties. A number of embodiments and examples have been described herein and as follows. Nevertheless, it will be understood that various modifications may be made. Accordingly, other embodiments are within the scope of the claims.

EXAMPLES

Example 1. Production of Nitrogen-Doped Nanoporous Carbon Membranes with Gradient Pore Architecture and Superior Electrochemical Performance Chemicals. 1-Vinylimidazole (Aldrich 99%), 2,2'-azobis (2-methylpropionitrile) (AIBN, 98%), bromoacetonitrile (Aldrich 97%), bistrifluoromethanesulfonimide lithium salt (Aldrich 99%) were used as received without further purifications. Dimethyl sulfoxide (DMSO), dimethyl formamide (DMF), methanol, and tetrahydrofuran (THF) were of analytic grade. Poly(acrylic acid) (PAA) (MW: 2000 g/mol, solid powder; MW: 100,000 g/mol, 35 wt % in water, MW: 250,000 g/mol, 35 wt % in water; Mw: 450,000 g/mol, solid powder; Mw: 3,000,000 g/mol, solid powder) were obtained from Sigma Aldrich (St. Louis, Mo. USA).

Figure 8:
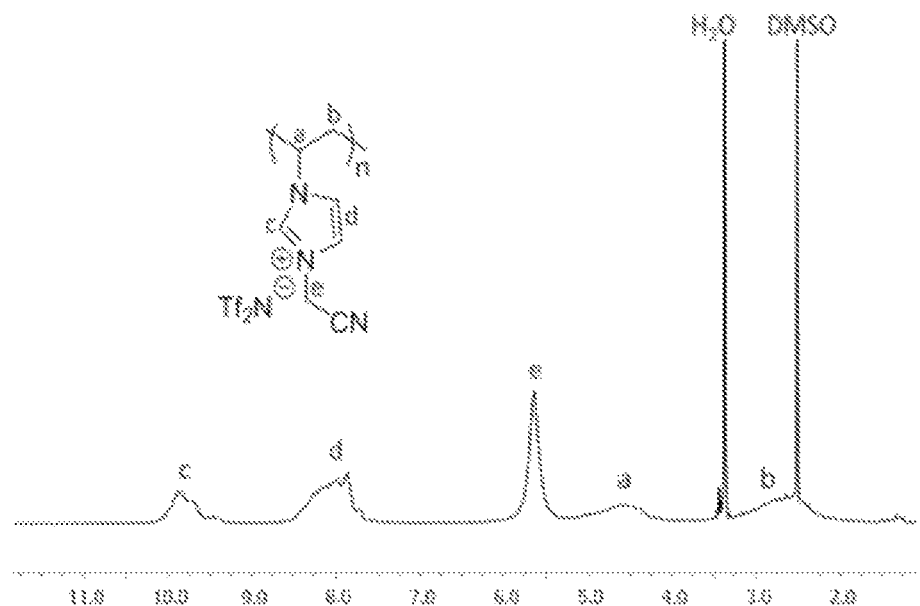
FIG. 8 is a graph showing the $^1$H-NMR spectra of PCMVImTf$_2$N in DMSO-d6.
Figure 9:
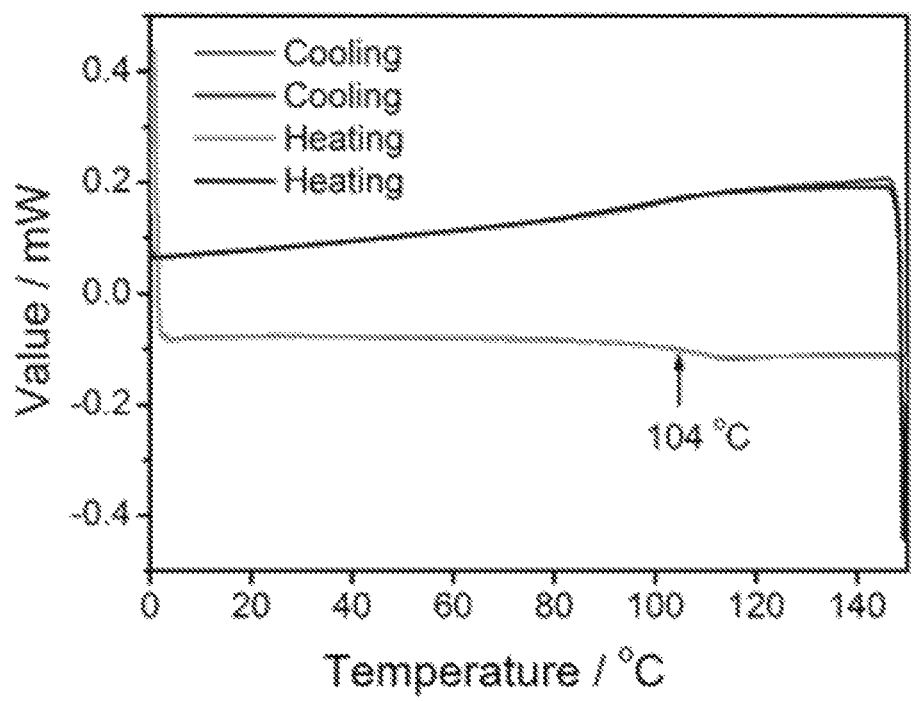
FIG. 9 is a graph showing the differential scanning calorimetry (DSC) curve of PCMVImTf$_2$N, which shows the glass transition temperature of PCMVImTf$_2$N is about 104° C.
Figure 10:
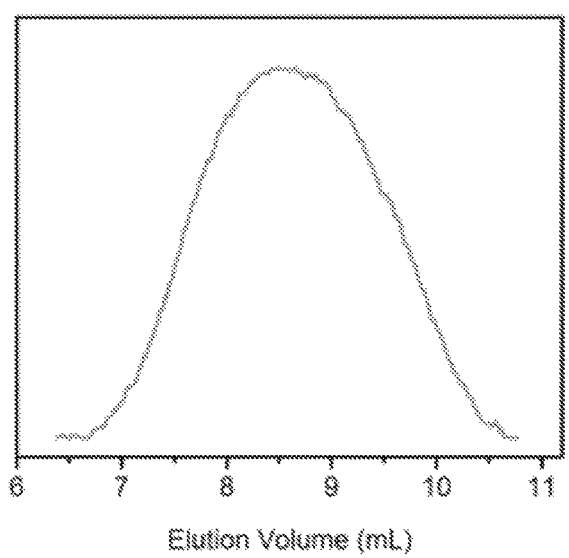
FIG. 10 is a graph showing gel permeation chromatography (GPC) trace measured for Poly(3-cyanomethyl-1-vinylimidazolium bromide) (PCMVImBr). The apparent molecular weight and polydispersity index (PDI) value of PCMVImBr was 5.80×10$^5$ g/mol and 3.85, respectively (measured by GPC, eluent: water with a mixture of 80% acetate buffer and 20% methanol). Poly[3-cyanomethyl-1-vinylimidazolium bis(trifluoro methanesulfonyl)imide] (PCMVImTf$_2$N) was prepared by anion exchange of PCMVImBr with LiTf2N salt. Therefore, the apparent molecular weight of the PCMVImTf$_2$N is calculated to be 1.12×106 g/mol.

Preparation of gradient porous polymer membranes (GPPMs). First poly[1-cyanomethyl-3-vinylimidazolium bis(trifluoromethanesulfonyl) imide], PCMVImTf$_2$N was synthesized according to Yuan et al., Ionic liquid monomers and polymers as precursors of highly conductive, mesoporous, graphitic carbon nanostructures. Chem. Mater. 22:5003-5012 (2010). The $^1$H-NMR spectra, differential scanning calorimetry (DSC) as well as gel permeation chromatography (GPC) curves of PCMVImTf$_2$N are listed as FIG. 8, FIG. 9 and FIG. 10, respectively. Typical procedure for preparation of GPPMs, 1.0 g of PCMVImTf$_2$N and 0.18 g of poly(acrylic acid) (different molecular weights) were dissolved in 40 mL of dimethylformamide (DMF) solvent to form an homogeneous solution, which was then cast onto a clean glass plate. The liquid film on the glass plate was dried at 80° C. for 2 hours and then soaked in 0.1 wt % aqueous ammonia for 2 hours at room temperature (25° C.). After the soaking step, a yellowish and flexible freestanding GPPMs was easily detached from the glass substrate.

Fabrication of the hierarchically structured porous nitrogen-doped carbon membranes (HNDCMs). First, the as-prepared GPPM were clapped between two clean quartzes and dried at 60° C. overnight under atmospheric pressure. For the carbonization process, the GPPMs were heated to 300° C. with a heating rate of 3° C. min$^{-1}$ under nitrogen flow, and hold at 300° C. for one hour. It was then heated to desired carbonization temperature with a heating rate of 3° C. min$^{-1}$ under nitrogen flow. After holding at the final temperature for 1 hour, the samples were cooled down to room temperature. During the process of carbonization, the pressure was kept constant at 1.5 torr.

Fabrication of HNDCM-100,000-1000 loaded Co catalyst (HNDCM-100,000-1000/Co). Freshly prepared GPPM-100,000 was placed in 200 mL of cobalt acetate aqueous solution (2 wt %) at pH ~5 adjusted with 0.1 M acetic acid. The mixture was refluxed at 80° C. for 24 hours. Afterward, GPPM-100,000-Co(CH$_3$COO)$_2$ was taken out from the solution, washed with water, and dried at room temperature. Finally, pyrolysis of GPPM-100,000-Co(CH$_3$COO)$_2$ was carried out similar to that of the HNDCMs, leading to HNDCM-100,000-1000/Co.

Characterization. $^1$H— and solid state $^{13}$C-NMR spectra were recorded on a Bruker AVANCE III spectrometer (Bruker, Billerica, Mass. USA) operating at 400 and 100 MHz resonance frequencies, respectively. NMR chemical shifts are reported with respect to tetramethylsilane (TMS) as an external reference. X-ray diffraction experiments (XRD) patterns were measured with a Rigaku powder X-ray diffractometer (Rigaku, The Woodlands, Tex. USA) using Cu Kα($\lambda$=1.5418 Å) radiation. X-ray photoelectron spectroscopy (XPS) data were collected by an Axis Ultra instrument (Kratos Analytical, Manchester UK) under ultrahigh vacuum (<10$^{-8}$ Torr) and by using a monochromatic Al Kα X-ray source. The adventitious carbon is peak was calibrated at 285 eV and used as an internal standard to compensate for any charging effects. Raman measurements were performed on a Renishaw inVia Reflex with an excitation wavelength of 473 nm and laser power of 100 mW at room temperature. Nitrogen sorption isotherms were measured at −196° C. using a Micromeritics ASAP 2020M and 3020M system (Micromeritics Instrument Corp, Norcross, Ga. USA). The samples were degassed for 6 hours at 200° C. before the measurements. Pore size distribution was calculated by density functional theory (DFT) method. Gel permeation chromatography (GPC) was conducted at 25° C. on NOVEMA-column with mixture of 80% acetate buffer and 20% methanol as eluent. (Flow rate: 1.00 mL/min, polyethyleneoxide (PEO) standards using RI detector-Optilab-DSP-Interferometric Refractometer). Thermal gravimetric analyses (TGA) were performed on a Netzsch TG209-F1 apparatus at a heating rate of 10° C. min$^{-1}$ under N$_2$ flow. Elemental analyses were obtained from the service of Mikroanaly-tisches Labor Pascher (Remagen, Germany). A field emission scanning electron microscope (FESEM, FEI Quanta 600 FEG) was used to acquire SEM images. Transmission electron microscope (TEM) and high resolution TEM (HRTEM) images, selected-area electron diffraction (SAED) patterns, and the high-angle annular dark-field scanning transmission electronmicroscopy-energy dispersive spectroscopy (HAADF-STEM-EDS) data were taken on a JEOL JEM-2100F transmission electron microscope (Jeol, Acworth Ga. USA) operated at 200 kV.

Electrochemical measurements. The electrochemical measurements were performed with an electrochemical impedance spectroscopy (EIS) capable channel in a Biologic VMP3 potentiostat. A graphite rod and an Ag/AgCl (in saturated KCl solution) electrode were used as the counter and reference electrodes, respectively. All the applied potentials are reported as reversible hydrogen electrode (RHE) potentials scale using E (vs. RHE)=E (vs. Ag/AgCl)+0.217 V+0.0591 V*pH after IR correction. Potentiostatic EIS was used to determine the uncompensated solution resistance (Rs). The HER and OER activity of HNDCM-100,000-1000/Co was evaluated by measuring polarization curves with linear sweep voltammetry (LSV) technique at a scan rate of 1 mV/s in 1.0 M KOH (pH 14) solution. The stability tests for the HNDCM-100,000-1000/Co catalysts were performed using chronoamperometry at a constant applied overpotential.

Results. The bottom-up approach is used for large-scale fabrication provided hierarchically structured nitrogen-doped nanoporous carbon membranes (HNDCMs) via morphology-retaining carbonization of polymer precursor. Particularly, the pores along the membrane cross-section assume a gradient distribution in their sizes, and the pore walls show unusual single-crystal-like characteristics. As a prototypical application, such highly conductive nanoporous carbon membrane, after being loaded with cobalt nanoparticles, exhibited an ultrahigh electrolyzer efficiency as active bifunctional electrocatalyst for overall water splitting.

Figure 11:
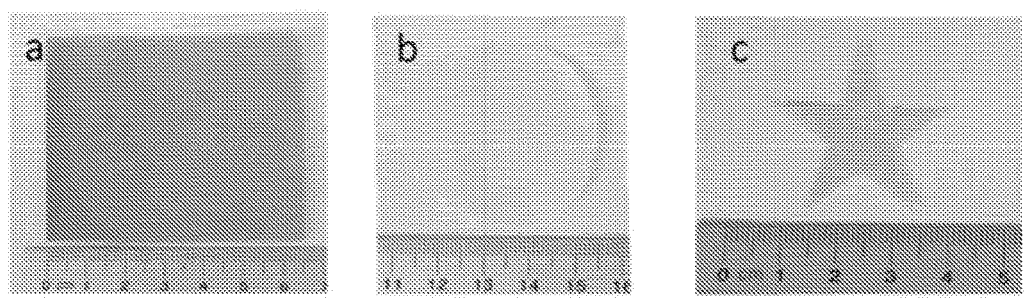
FIG. 11 are images showing gradient porous polymer membranes with different shapes.

FIG. 1A illustrates the membrane fabrication process. First, porous polyelectrolyte membranes (GPPMs) with gradually varying pore sizes along the membrane cross-section, were assembled according to a previously reported procedure by exploiting electrostatic crosslinking, i.e., inter-polyelectrolyte complexation between cationic poly[1-cyanomethyl-3-vinylimidazolium bis(trifluoromethanesulfonyl)imide] (PCMVImTf$_2$N) and anionic neutralized poly(acrylic acid) (PAA). The structure characterization of PCMVImTf$_2$N (FIGS. 8-10) and details of polymer membrane fabrication are provided. It should be noted that the preparation of GPPMs is a mature and robust technique, which can produce various pore profiles at desirable size scales (FIG. 11). Afterwards, direct pyrolysis of the free-standing GPPMs under nitrogen flow forms HNDCMs. For example, carbonization of a piece of a rectangular GPPM of 7.2×3.3 cm$^2$ in size and 96 μm in thickness (FIG. 1B) produced a HNDCM of 5.2×2.5 cm$^2$ and 52 μm (FIG. 1C). The shrinkage of the membrane dimensions in the pyrolysis is accompanied by a weight reduction by 75%.

SEM images (FIG. 12-17) of GPPMs and HNDCMs prepared with different molecular weight (M$_w$) of PAA demonstrate that the morphologies of the HNDCMs are precisely controlled by the molecular weight of PAA. Without meaning to be limited by theory, the formation mechanism of gradient, hierarchical porous polymer membrane can be explained from a diffusion-controlled kinetic point of view. That is, the diffusion of aqueous NH$_3$ into the PCMVImTf$_2$N/PAA blend film from the top to the bottom is a crucial step. When the dried PCMVImTf$_2$N/PAA blend film sticking to a glass plate is immersed in aqueous NH$_3$ solution, rapid and thorough electrostatic complexation takes place in the surface region because of the direct and full contact with the solution. After the first stage of full-contact electrostatic complexation, aqueous NH$_3$ gradually diffuses into the bulk membrane, neutralizes PAA and introduces interpolyelectrolyte complexation. Thus, this diffusion creates a gradient in the degree of electrostatic complexation (DEC) and correspondingly in the pore size distribution. The DEC of GPPMs prepared with different M$_w$ of PAA are listed in Table 1.

TABLE 1

Figure 30:
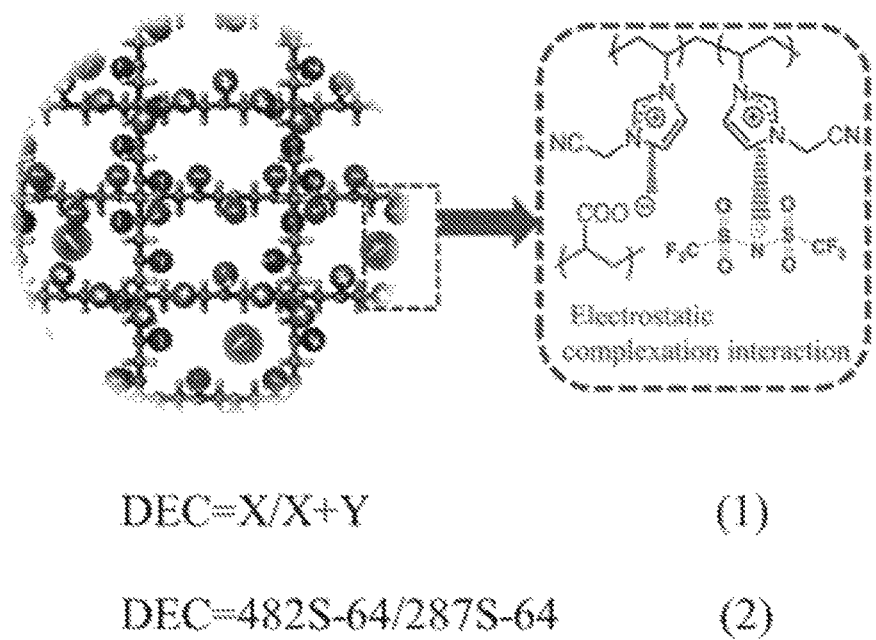
FIG. 30 is a schematic showing the method for defining the degree of electrostatic complexation (DEC) of the GPPM-100,000-1000. Equations for defining and calculating DEC. In equation (1), X denotes the imidazolium units that undergo electrostatic complexation with COO— groups on PAA; Y denotes the imidazolium units in the membrane that are not involved in the electrostatic complexation. In equation (2), S denotes the sulfur weight content. The results of the elemental analyst show that the S content is 12% in GPPM-100,000. The DEC of GPPM-100,000-1000 is calculated to be 20.8%. The content of the bistrifluoromethanesulfonimide (Tf$_2$N—) can be calculated as 28.3 mol % and 53.8% wt % in the GPPM-100,000.

Degree of electrostatic complexation (DEC) of the GPPMs calculated by equations as listed in FIG. 30.

| GPPM | S content determined by elemental analysis | DEC |
|---|---|---|
| GPPM-2000 | 12.6% | 11.7% |
| GPPM-100,000 | 12.0% | 20.8% |
| GPPM-250,000 | 12.1% | 19.4% |
| GPPM-450,000 | 11.7% | 24.9% |
| GPPM-3,000,000 | 11.8% | 23.6% |

Figures 12A, 12B:
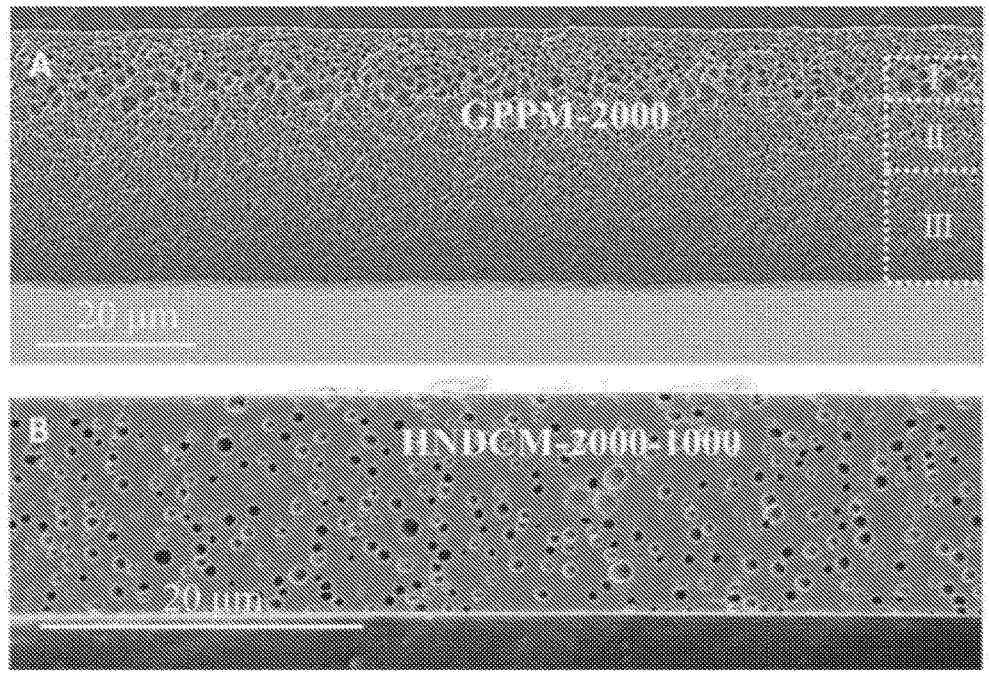
FIG. 12A is a cross-section SEM image of GPPM prepared with PCMVImTf2N and PAA of Mw ~2000 g/mol. Here, notations of GPPM-x and HNDCM-x-y are used, where x and y denote the Mw of PAA and the carbonization temperature, respectively.
FIG. 12B is a cross-section SEM image of HNDCM-2000-1000° C. It clearly shows the pores in GPPM-2000 is continuous and gradiently distributed (FIG. 12A). The average pore sizes are 2.1 µm in Zone (I), 650 nm in Zone (II), and 600 nm at the bottom. From FIG. 12B, the pores in HNDCM-2000-1000 are random and inconsecutive, indicating the morphology-maintaining carbonization cannot be achieved by pyrolysis of GPPM-2000.
Figure 13:
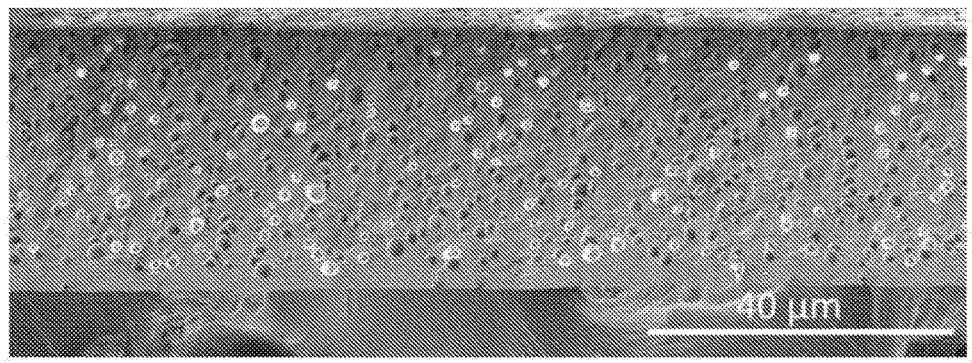
FIG. 13 is a cross-section SEM image of the sample GPPM-2000 carbonized at 300° C.
Figure 14:
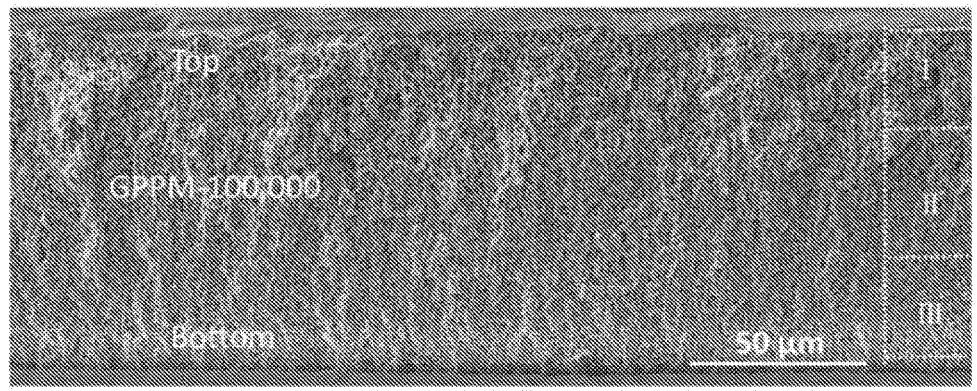
FIG. 14 is a cross-section SEM image of the GPPM-100,000, the pore sizes gradually decrease from the top layer (zone I, average pore size: 900 nm) to middle layer (zone II, average pore size: 740 nm) to bottom layer (zone III, average pore ore size: 500 nm).

The correlation between pore architectures and molecular weight of polymeric precursors was investigated by pairing the same PCMVImTf$_2$N with PAA of different M$_w$. Here, notations of GPPM-x and HNDCM-x-y are used, where x and y denote the M$_w$ of PAA and the carbonization temperature, respectively. These two crucial parameters are carefully paired to prepare carbon membranes with desirable characteristics. For instance, GPPM-2000 displays an interconnected porous network, while its carbon product at 1000° C., HNDCM-2000-1000, have only inconsecutive pores (FIG. 12). In fact, the interconnected pores in GPPM-2000 were found blocked even at 300° C. (FIG. 13). Surprisingly, pyrolysis of GPPM-100,000 (FIG. 14) at 1000° C. preserves its well-defined nanoporous morphology (FIG. 1D), and an asymmetric, three-dimensionally interconnected pore architecture was spontaneously created in HNDCM-100,000-1000.

Figures 15A, 15B, 15C, 15D:
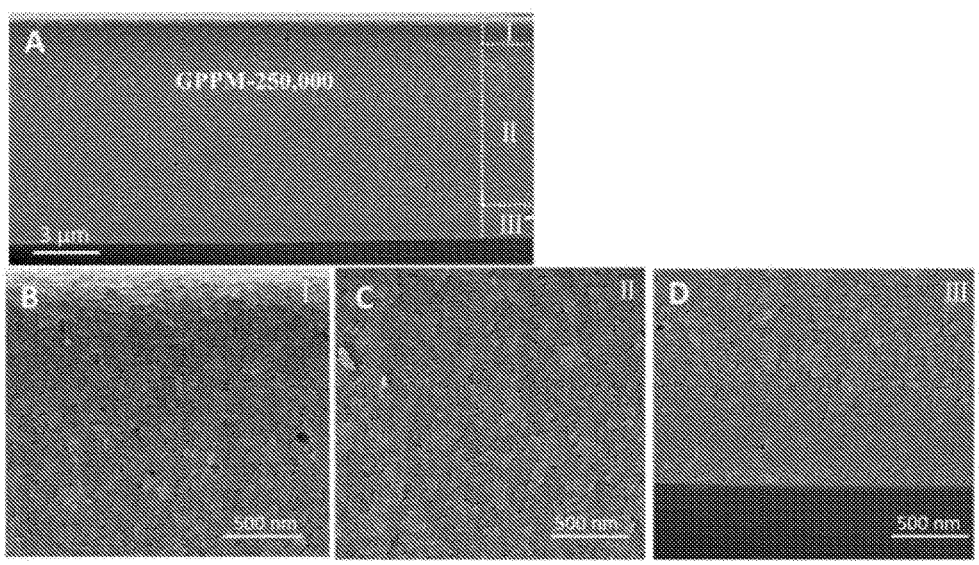
FIG. 15A is a cross-section SEM image of GPPM-250,000.
FIGS. 15B-15D are representative SEM images of the cross-section structures of GPPM-250,000.
Figures 16A, 16B, 16C, 16D, 16E:
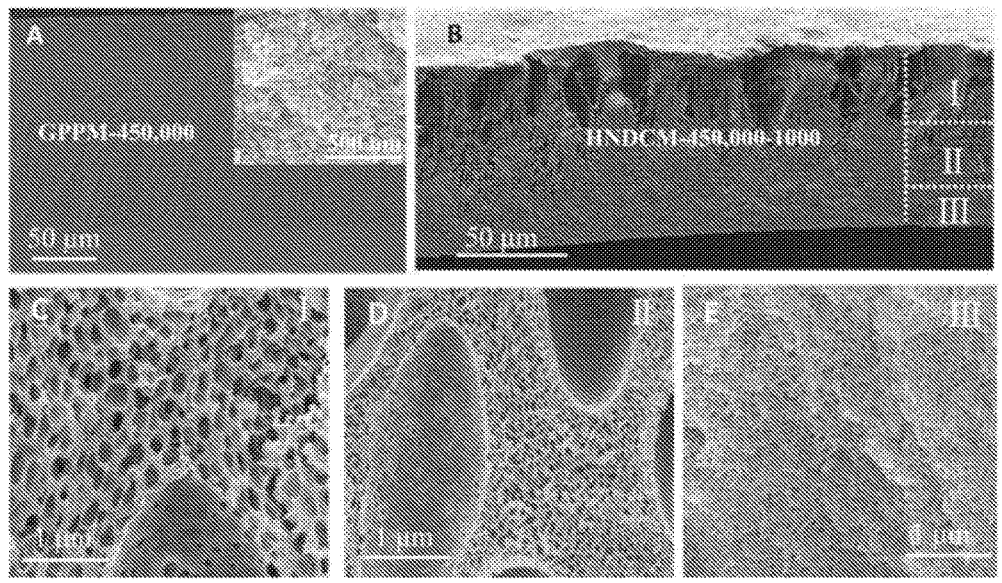
FIGS. 16A-16E are cross-section SEM images.
Figures 17A, 17B, 17C, 17D, 17E:
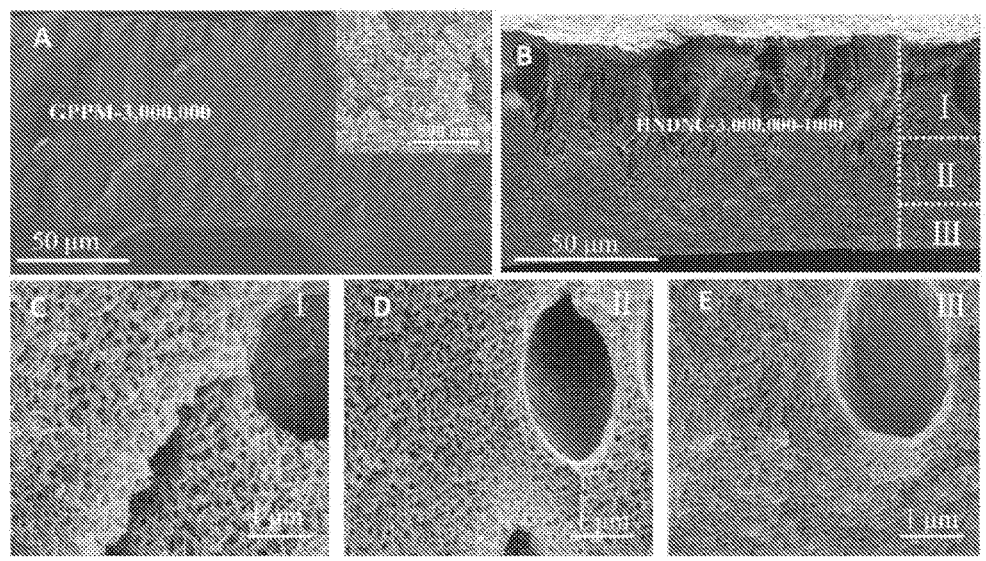
FIGS. 17A-17E are cross-sectional SEM images.

The pore size of HNDCM-100,000-1000 gradually decreases from 1.5 μm, 900 nm to 550 nm from the top to the bottom in zone I, zone II to zone III, respectively. Impressively, in sample HNDCM-250,000-1000, the pore size (FIG. 1E-H) enters nanoscale with 250 nm, 75 nm, and 32 nm in zone I, zone II and zone III, respectively, where the bottom (zone pores are in fact mesopores. Pyrolysis in general enlarged the pore size in HNDCMs in reference to GPPMs due to the considerable mass loss in a form of volatile species generated during carbonization (FIG. 15). As for PAA of even higher M$_w$ of 450,000 and 3,000,000, the carbon membranes were highly porous yet became too fragile upon carbonization (FIG. 16, 17).

Figure 18:
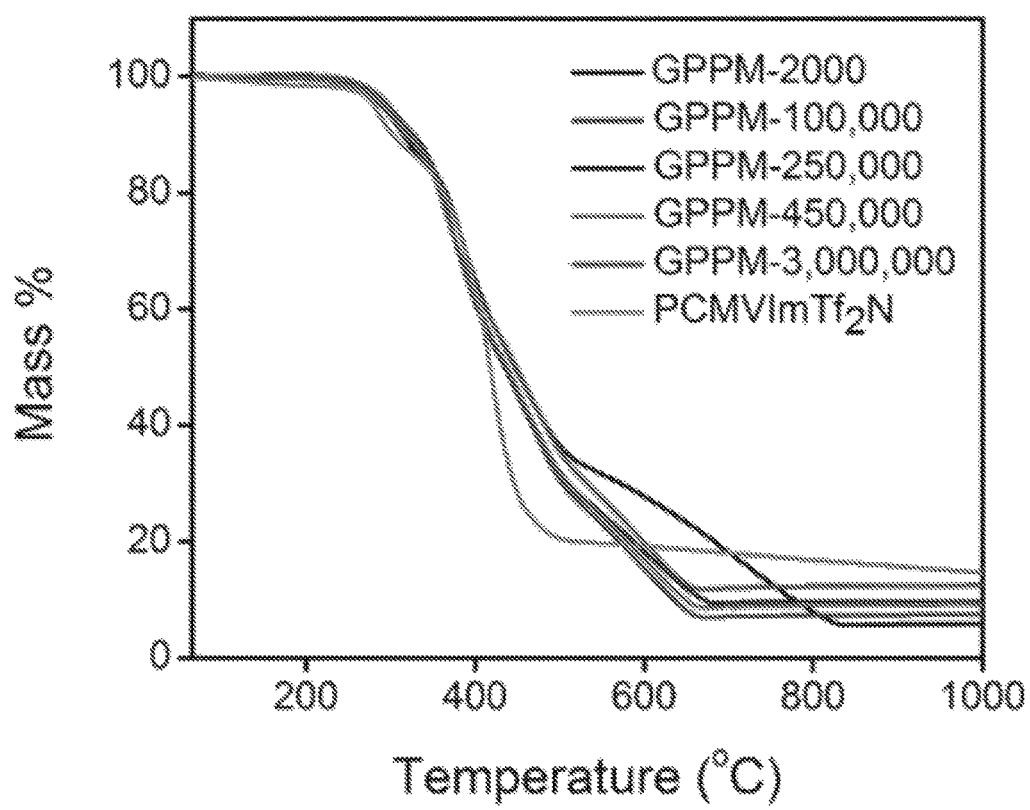
FIG. 18 is a graph showing thermal gravimetric analyses (TGA) curves of PCMVImTf$_2$N and GPPMs prepared with PCMVImTf$_2$N and PAA of different molecular weights.

The crosslinking density in the GPPMs increases with increasing M$_w$ of PAA (Table 1). The collapse of GPPM-2000 at temperature above 300° C. is caused by the relatively low crosslinking density (thus too large pores) that cannot stabilize the pores, while the cracking of carbon membranes prepared from PAA of M$_w$~450,000 and 3,000,000 results from the excessively high crosslinking density (thus too small pores) that build up excessive inner stress in the carbonization process. Only pyrolysis of polymer membranes that are built up from polymers of moderate M$_w$s will keep their integrity. According to the thermogravimetric analysis (TGA) (FIG. 18), these polymer membranes start to detach their alkyl chains, H and O elements at 280° C., and thermally induced trimerization reaction of the cyano groups simultaneously occur at this stage to build up a stable triazine network to preserve the pore structure. It was previously shown that morphology-retaining carbonization could hardly be achieved by pyrolysis of polymer precursors because pyrolysis usually breaks down polymeric chains and results in the formation of cracks and/or foams. However, the synthesis of HNDCMs here demonstrate that the porous nano/microstructure in the carbon precursor can be partially or fully preserved by the synergy between the initial cross-linked state of the precursor and the formation of a thermally stable network intermediate during the bottom-up carbonization process.

Figures 2A, 2B, 2C, 2D, 2E, 2F, 2G, 2H, 2I:
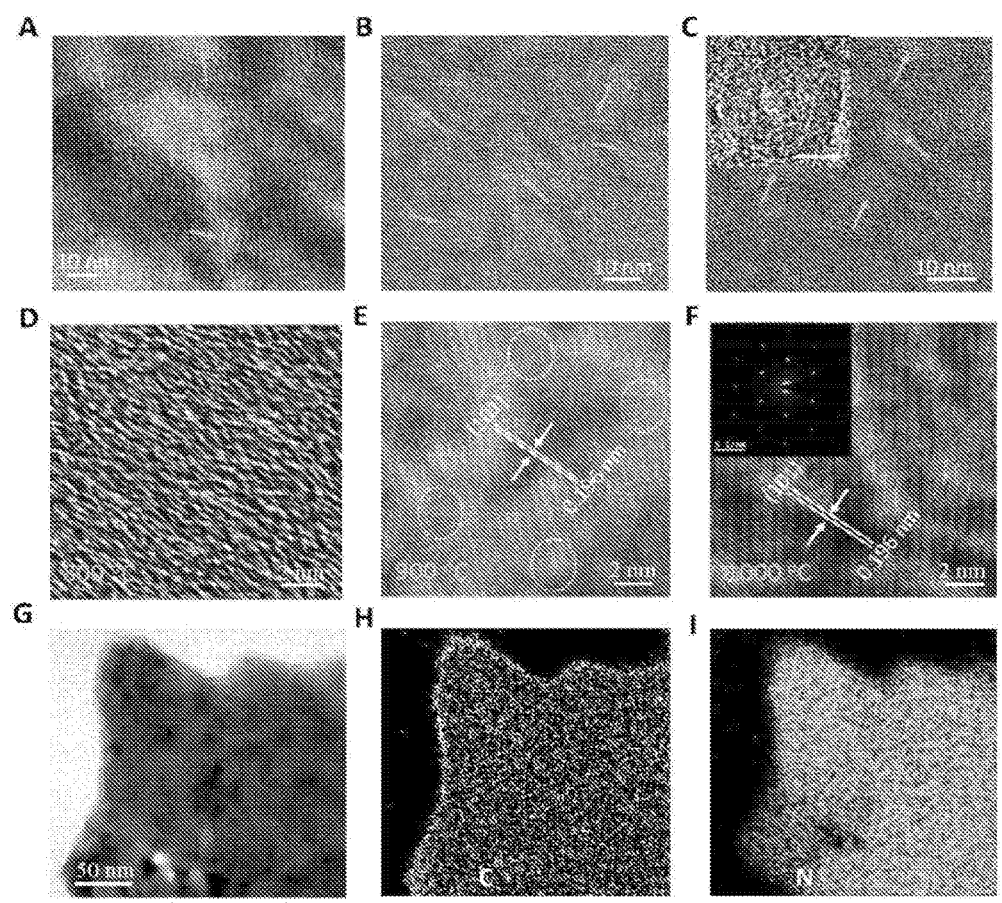
FIGS. 2A-2F show characterizations of the pore wall structure of the membranes. High resolution transmission electron microscope (HRTEM) images of (FIG. 2A) HNDCM-100,000-800, (FIG. 2B) HNDCM-100,000-900 and (FIG. 2C) HNDCM-100,000-1000 (inset is the onion-like graphitic structure, scale bar: 5 nm); HRTEM images of (FIG. 2D) HNDCM-100,000-800, (FIG. 2E) HNDCM-100,000-900 and (FIG. 2F) HNDCM-100,000-1000. All the HRTEM images were taken from the areas of macropore walls. Inset in (FIG. 2F) is the selected-area electron diffraction (SAED) pattern taken from HNDCM-100,000-1000. The SAED yielded spotty patterns, indicating single crystal-like characteristics of HNDCM-100,000-1000.
(FIGS. 2G, 2H and 2I) TEM image and the corresponding element (C and N) mappings.
Figure 19:
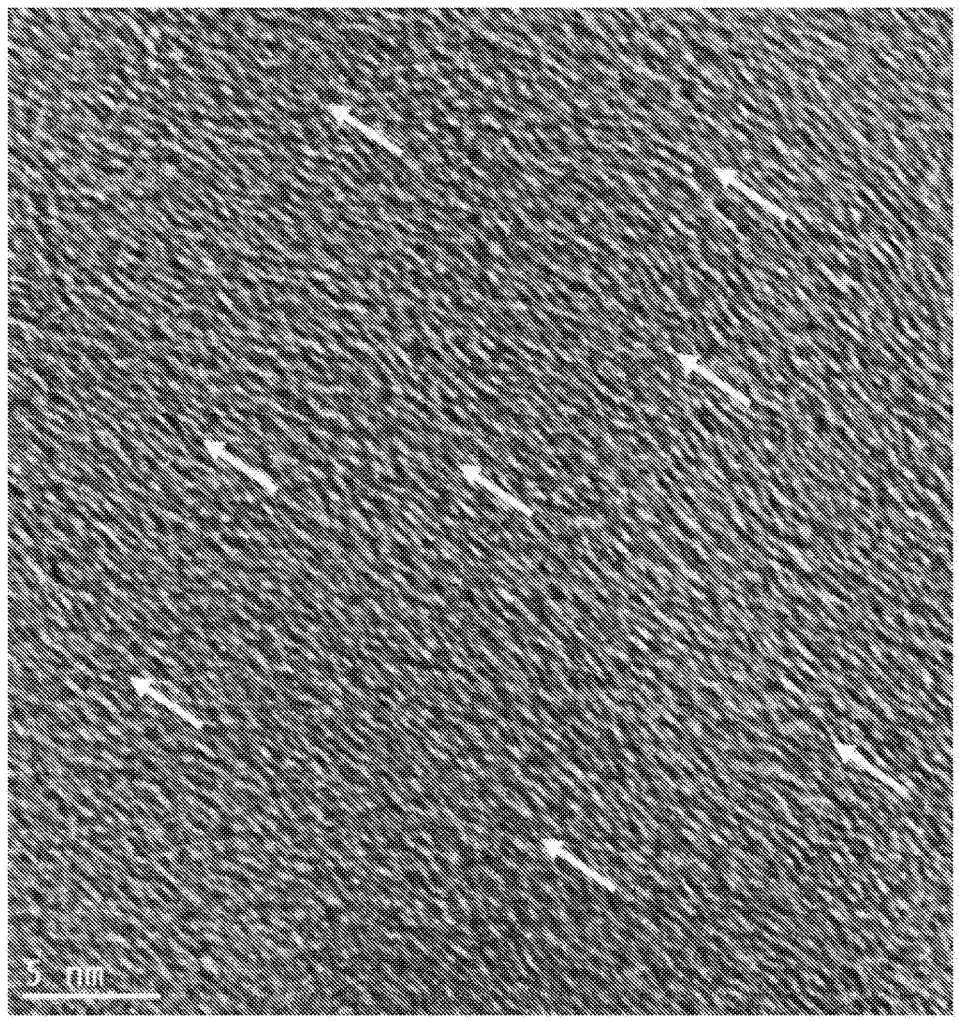
FIG. 19 is a HRTEM image of the HNDCM-100,000-800. The arrows point out the preferential orientation of the layered graphitic planes.
Figure 20:
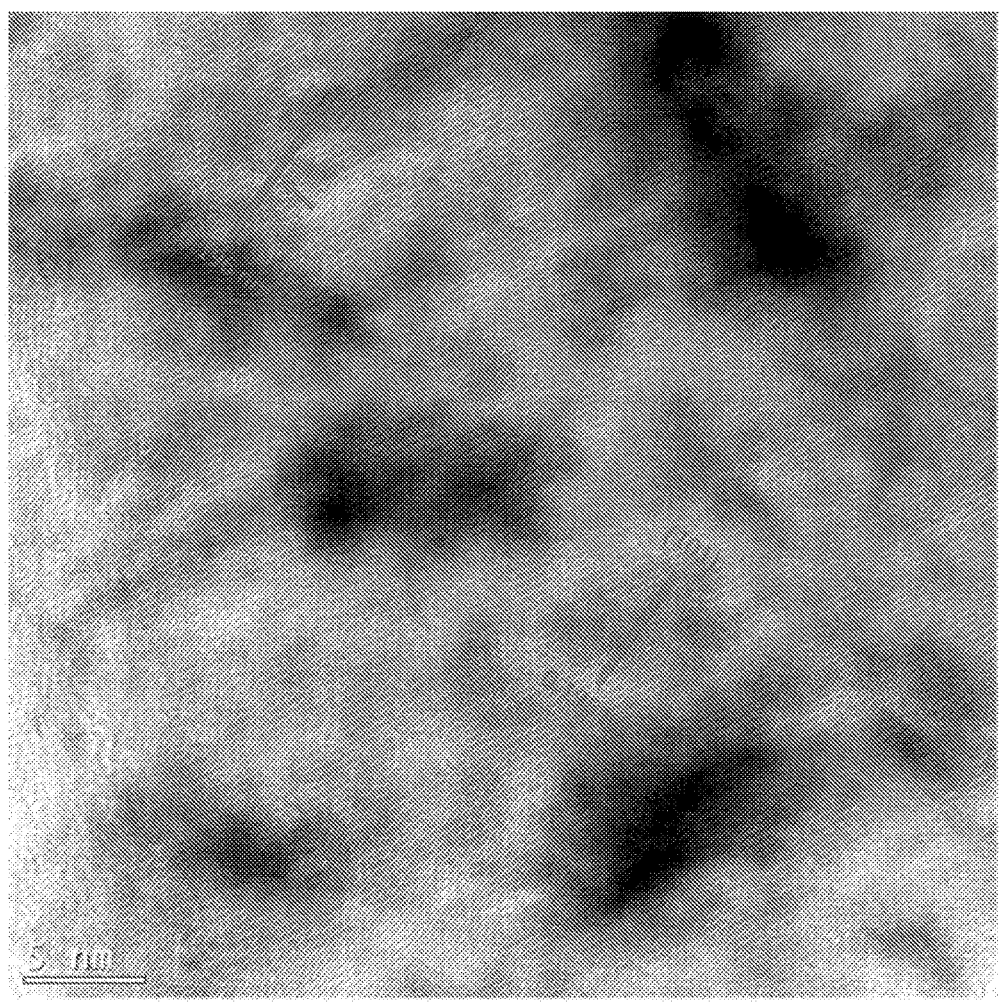
FIG. 20 is HRTEM image of the HNDCM-100,000-900 with (101) plane dominated sheets. It should be noted that in HNDCM-100,000-900, two phases were observed: one is the (101) plane dominated graphitic sheets in the membrane matrix, as shown here, and the other phase is the (002) plane dominated concentric onion-like graphitic structures (FIG. 28).
Figure 21:
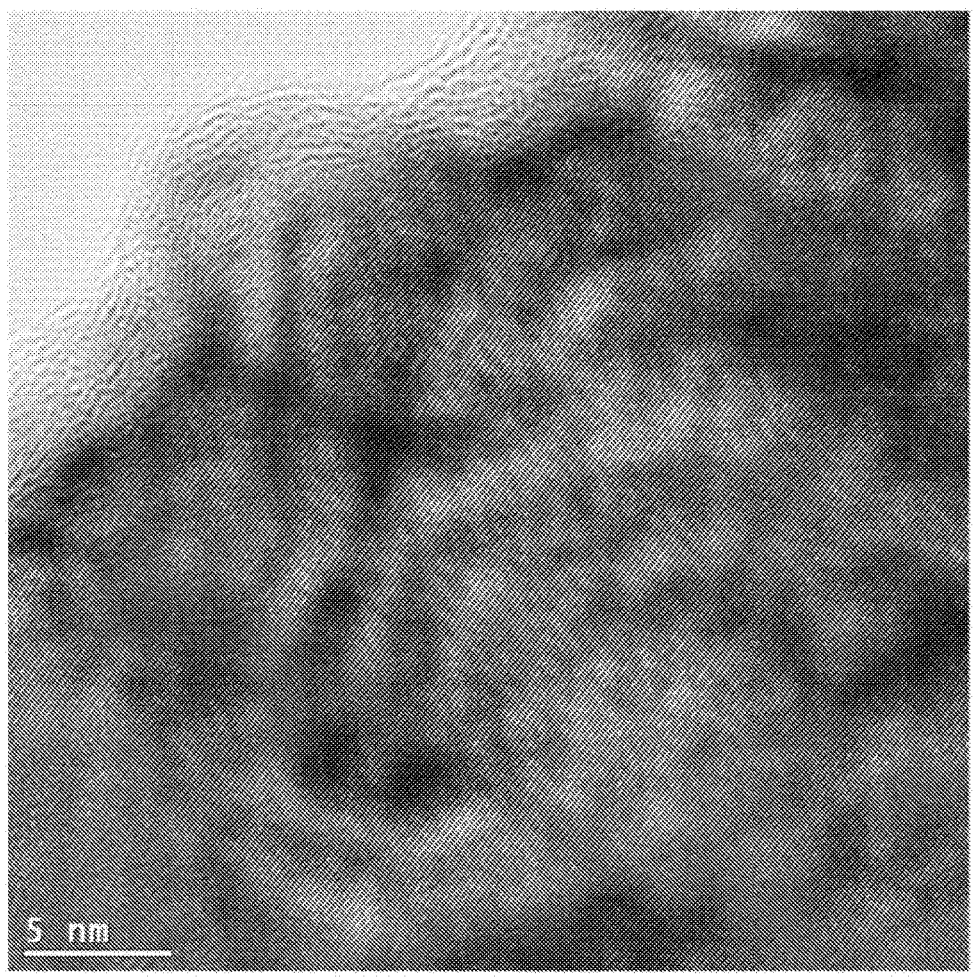
FIG. 21 is a HRTEM image of the HNDCM-100,000-1000 with (101) plane dominated sheets. Similar to HNDCM-100,000-900, in HNDCM-100,000-1000, two phases were also observed: one is the (101) plane dominated graphitic sheets, as shown here, and the other phase is the (002) plane dominated concentric onion-like graphitic structures (FIG. 29).

High-resolution transmission electron microscopy (HR-TEM) images shed light on the microscopic and atomic structures of samples HNDCM-100,000-y (y=800, 900, 1000) prepared at three different pyrolysis temperatures. FIG. 2A shows clearly the presence of mesopores (pore size between 2~50 nm) in HNDCM-100,000-800. Interestingly, as shown in FIGS. 2B and 2C, onion-like concentric graphitic nanostructures were observed consisting of multi-shells and hollow cage-like centers. The number of shells was observed to increase and the diameter of the hollow cages to decrease with the pyrolysis temperature increasing from 900 to 1000° C. The shells are composed of (002) plane with a d-spacing of 0.338 nm, as confirmed by HRTEM. The HRTEM images of HNDCM-100,000-800 shown in FIG. 2d and FIG. 19 evidence the preferential orientation of the graphitic layers. Unexpectedly, in HNDCM-100,000-900 a single-crystal-like atomic packing throughout the entire membrane emerged. The fringes show a well-defined d-spacing of 0.196 nm, which is corresponding to the (101) plane of graphite (FIG. 2E and FIG. 20). Structural defects were also observed in this sample (highlighted areas in FIG. 2E). It is notable that HNDCM-100,000-1000 has the same d-spacing as HNDCM-100,000-900, but much less lattice defects (FIG. 2F and FIG. 21).

Figure 22:
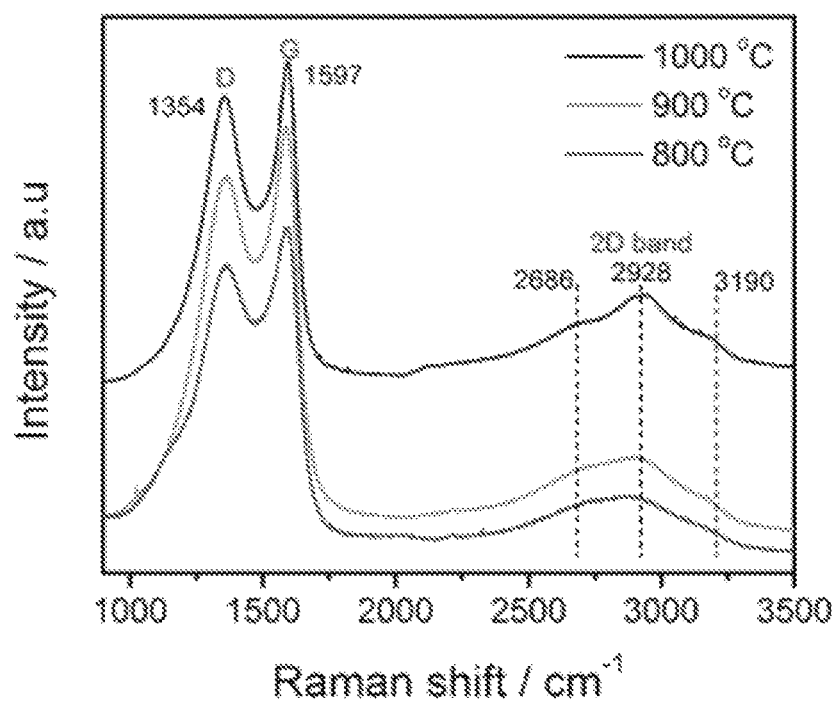
FIG. 22 is a graph showing Raman spectra of HNDCM-100,000-y (y=800, 900, 1000).
Figure 23:
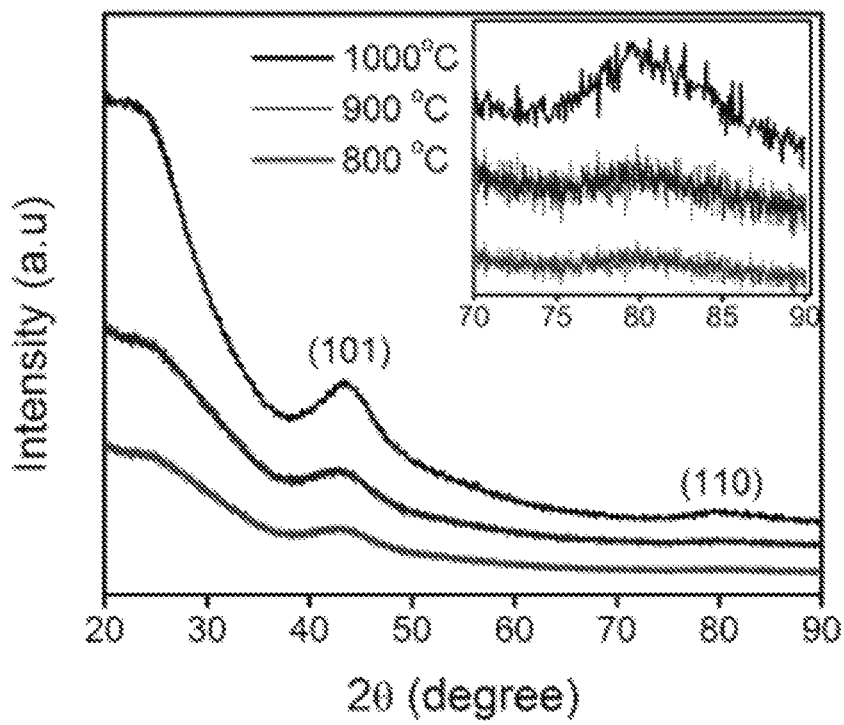
FIG. 23 is a graph showing x-ray diffraction (XRD) pattern of HNDCM-100,000-y (y=800, 900, 1000), inset is the enlarged XRD spectra from 70 to 90 degree. The three graphitic diffraction peaks of HNDCM-100,000 pyrolyzed at 800, 900 and 1000° C. appeared at 24.5, 43.3 and 80.0°, respectively. Specially, the appearance of the (110) band is usually considered as a proof of triperiodic order and consequently of a real graphitic phase. Inset shows that the intensity of the (110) band increased with increasing temperature, which indicates the degree of crystalline of carbon membranes was enhanced with increasing pyrolysis temperature.
Figure 24:
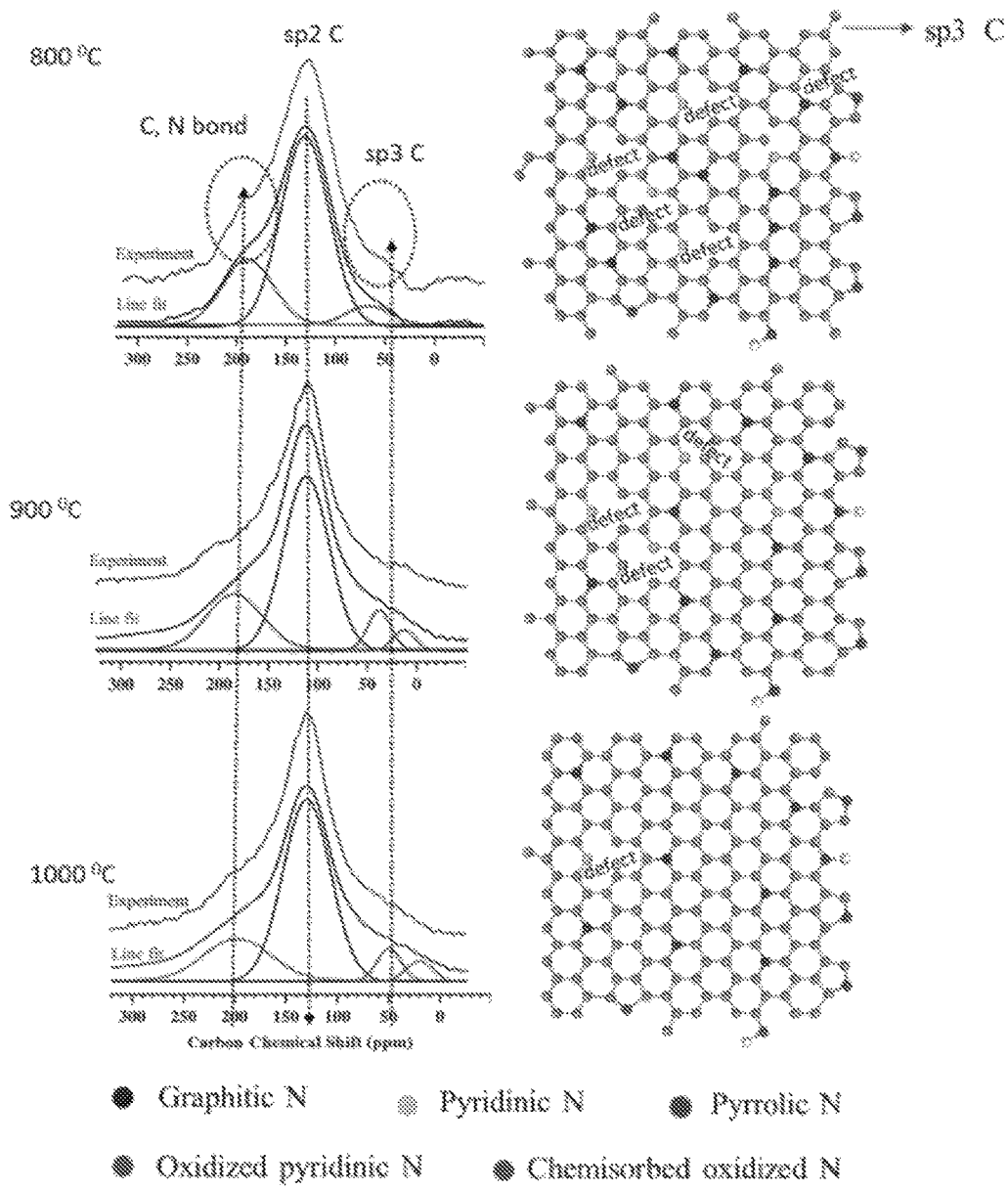
FIG. 24 are graphs and schematics showing solid-state $^{13}$C-NMR of HNDCM-100,000-y (y=800, 900, 1000). Solid state $^{13}$C-NMR-spectroscopies afford the qualitative and quantitative analysis of HNDCMs structures. The fitted lines show the content of carbon bonded nitrogen and sp3 hybrid C decreases while the content of sp2 hybrid C increases with increasing carbonization temperature from 800 to 1000° C., indicating that higher carbonization temperature results in a higher degree of graphitization. The result that the content of carbon bonded nitrogen decrease with increasing temperature is in agreement with the elemental analysis.

A selected area electron diffraction (SAED) measurement (inset in FIG. 2F) yields a six-fold symmetric spot pattern expected for graphite. As clearly revealed, the single-crystal-like structure is in fact layered graphitic structures, constructed from the stacking of nitrogen-doped graphene-like sheets. Raman spectroscopies of the HNDCM-100,000-y (y=800, 900, 1000) display two apparent bands at 1354 and 1597 cm$^{-1}$ (FIG. 22), which could be assigned, respectively, to the typical disorder band (D band) and graphitic band (G band) of carbon. The ID/IG ratio in three samples is ~0.85, indicating a similar structure regularity of all HNDCMs. 2D band is Raman active for crystalline graphitic carbons and it is sensitive to the 7E band in the graphitic electronic structure. It was found that the 2D peaks becomes much sharper with increasing carbonization temperature, being the strongest in HNDCM-100,000-1000, indicating progressive graphitization at elevated temperatures. A similar trend was further verified by XRD and solid state $^{13}$C-NMR measurements (FIG. 23, 24). Energy-filtered transmission electron microscopy (EFTEM) images of C and N elements (FIGS. 2H and 2I) show a uniform distribution of N atoms in the carbon matrix, which is expected as a result of in situ molecular doping of HNDCM with N. The synergy between the N lone-pair and the $\pi$-system of the C lattice can dramatically alter the physicochemical properties of the HNDCMs such as oxidative stability and catalytic activity (K. Gong et al., Science 323, 760-764 (2009)). For example, the sample HNDCM-100,000-1000 is fire-retardant. Even in an acetylene flame (>1000° C.) in air for 60 seconds, it maintains its original color and morphology, indicative of its excellent oxidative stability and its potential as a fire-retardant protective material.

The elemental analysis indicated N contents in HNDCM-100,000-800, HNDCM-100,000-900 and HNDCM-100,000-1000 as 11.7%, 8.27%, 5.7%, respectively. High N contents hinders the crystallinity of carbon and, in spite of a relatively lower N content, HNDCM-100,000-1000 is more graphitic than the other two. Nevertheless, the high crystalline membranes prepared at 900 or 1000° C., a relative low temperature with regard to graphitic carbons from polymer precursors, without employment of any metal species, are very unique. Pyrolysis of carbon precursors above 800° C. in the presence of metal catalysts (Co, Fe, Ni, Cr, Ge) improves graphitization. Here HNDCMs are free of metal catalyst, as confirmed additionally by X-ray photoelectron spectroscopy (XPS) measurements (FIG. 25).

TABLE 2

Figure 25:
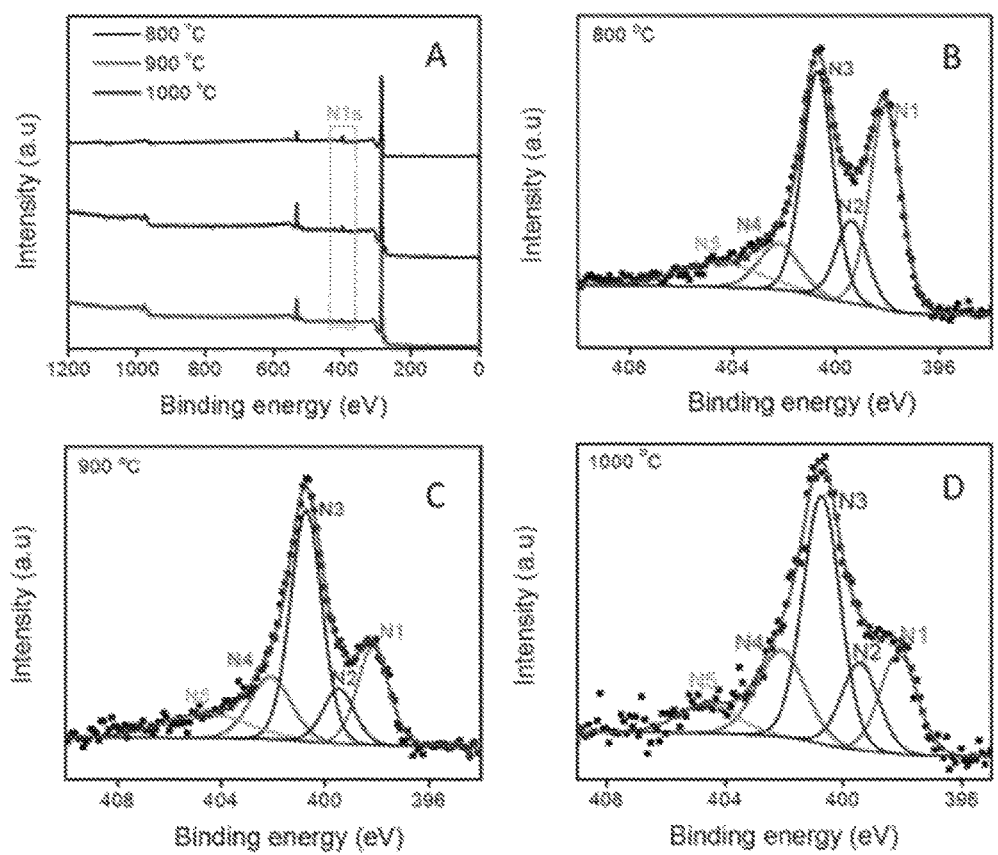

Data collected for FIG. 25, the normalized results of different N contents.

| Samples | N 1% | N 2% | N 3% | N 4% | N 5% |
|---|---|---|---|---|---|
| HNDCM-100,000-800 | 32.1 | 13.0 | 35.3 | 9.4 | 10.2 |
| HNDCM-100,000-900 | 18.5 | 10.4 | 43.6 | 15.3 | 12.2 |
| HNDCM-100,000-1000 | 17.1 | 14.8 | 41.6 | 18.9 | 7.6 |

The fitted XPS peaks for N1s orbit of HNDCM-100,000-y (y=800, 900, 1000) can be deconvoluted into five different bands at ~398.1, 399.5, 400.7, 402.1, 404.6 eV, which correspond to pyridinic (N1), pyrrolic (N2), graphitic (N3), oxidized pyridinic (N4) and chemisorbed oxidized nitrogen (N5), respectively. These various N species lead to different chemical/electronic environments of neighboring carbon atoms and hence different electrocatalytic activities. The curve fitting and the corresponding normalized results indicate a conversion from pyridine to graphitic nitrogen with increasing temperature, for example, the contents of pyridine N in HNDCM-100,000-800, HNDCM-100,000-900 and HNDCM-100,000-1000 are 32.1%, 18.5% and 17.1%, respectively, which is consistent with previous reports on N-doped carbon materials (Zhang et al., A metal-free bifunctional electrocatalyst for oxygen reduction and oxygen evolution reactions. Nat. Nanotech. 10, 444-452 (2015)).

Figure 26:
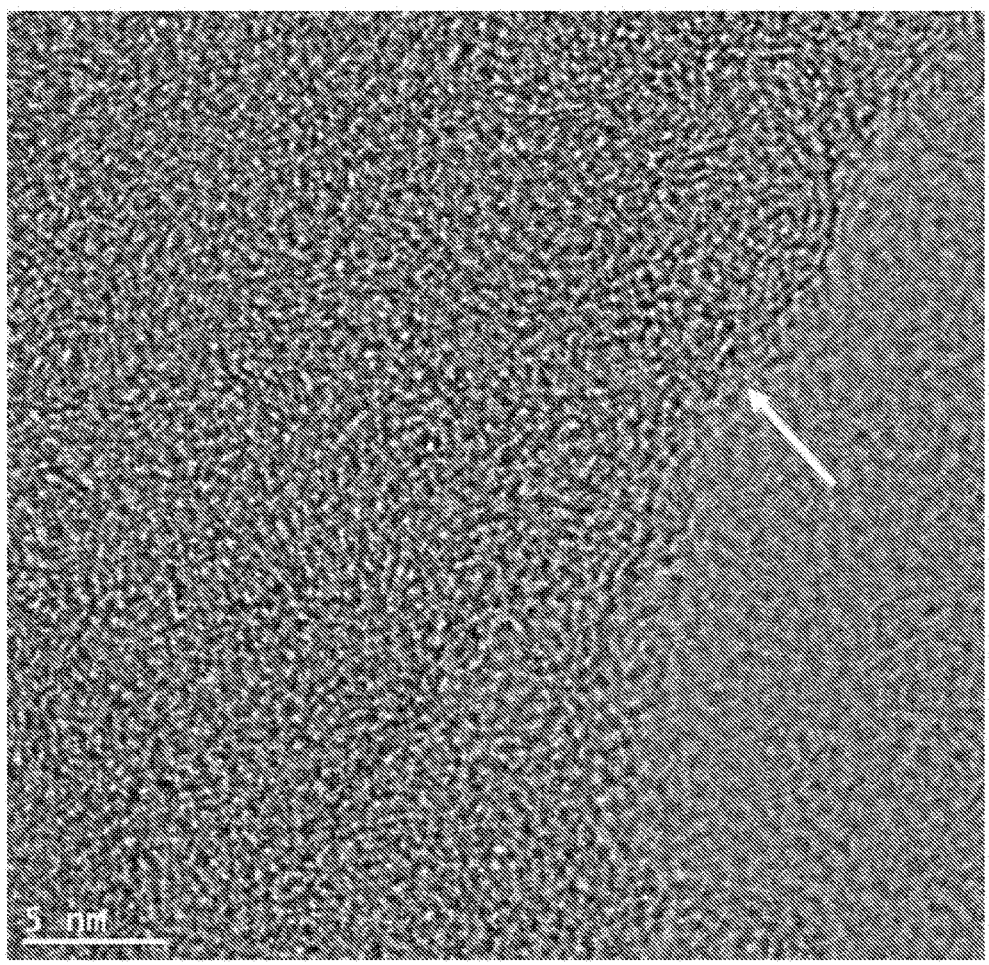
FIG. 26 is a HRTEM of carbon prepared by pyrolysis of native nonporous PCMVImTf$_2$N at 1000° C., the arrow indicates the N-doped carbon.
Figure 27:
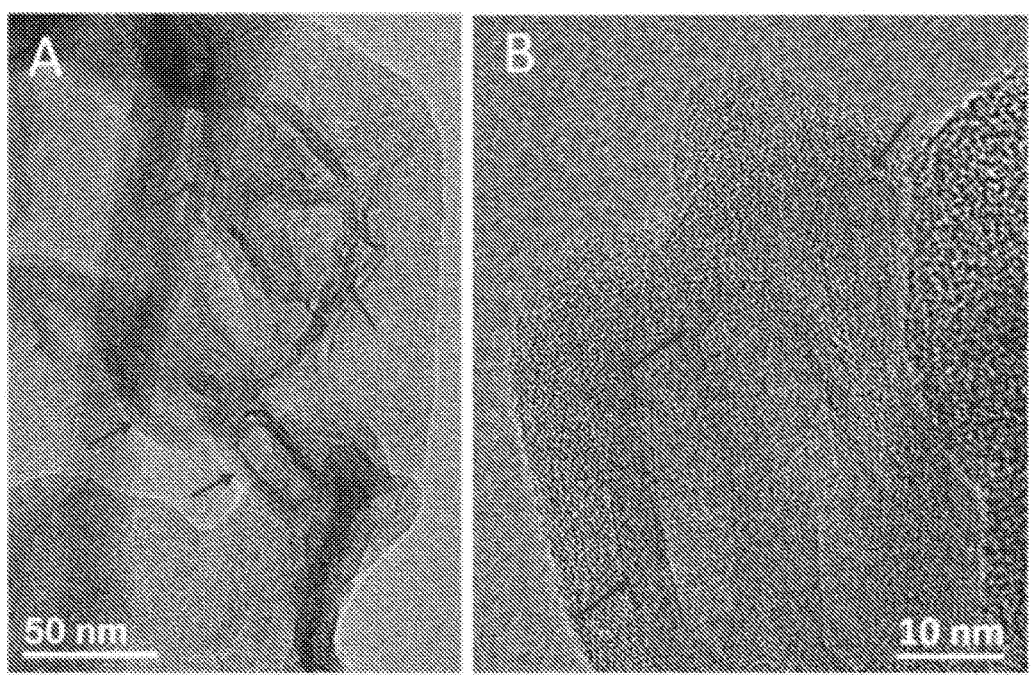
FIG. 27A is a TEM image of the HNDCM-2000-1000.
FIG. 27B is a HRTEM image of HNDCM-2000-1000. Arrows indicate the graphitic carbon.

No single-crystal-like carbons were obtained by carbonization at 1000° C. of either native PCMVImTf$_2$N or its physical mixture with PAA. See HRTEM image in FIG. 26. PCMVImTf$_2$N rather than PAA is the main carbon precursor for HNDCMs due to its high carbonization yield and being 75 wt % of the GPPMs. The poorly porous carbon membrane HNDCM-2,000-1000 was dominantly amorphous with graphitic domains surrounding only the pores (FIG. 27). Thus graphitization might be facilitated by the highly porous precursors at temperatures lower than those required for nonporous or poorly porous ones, a phenomenon presumably arising from the high-energy surfaces abundant in porous structures. Graphitization preferentially takes place at (111) planes because these planes are composed of zigzag hexagonal rings and can be easily rearranged into graphitic structures.

Figure 28:
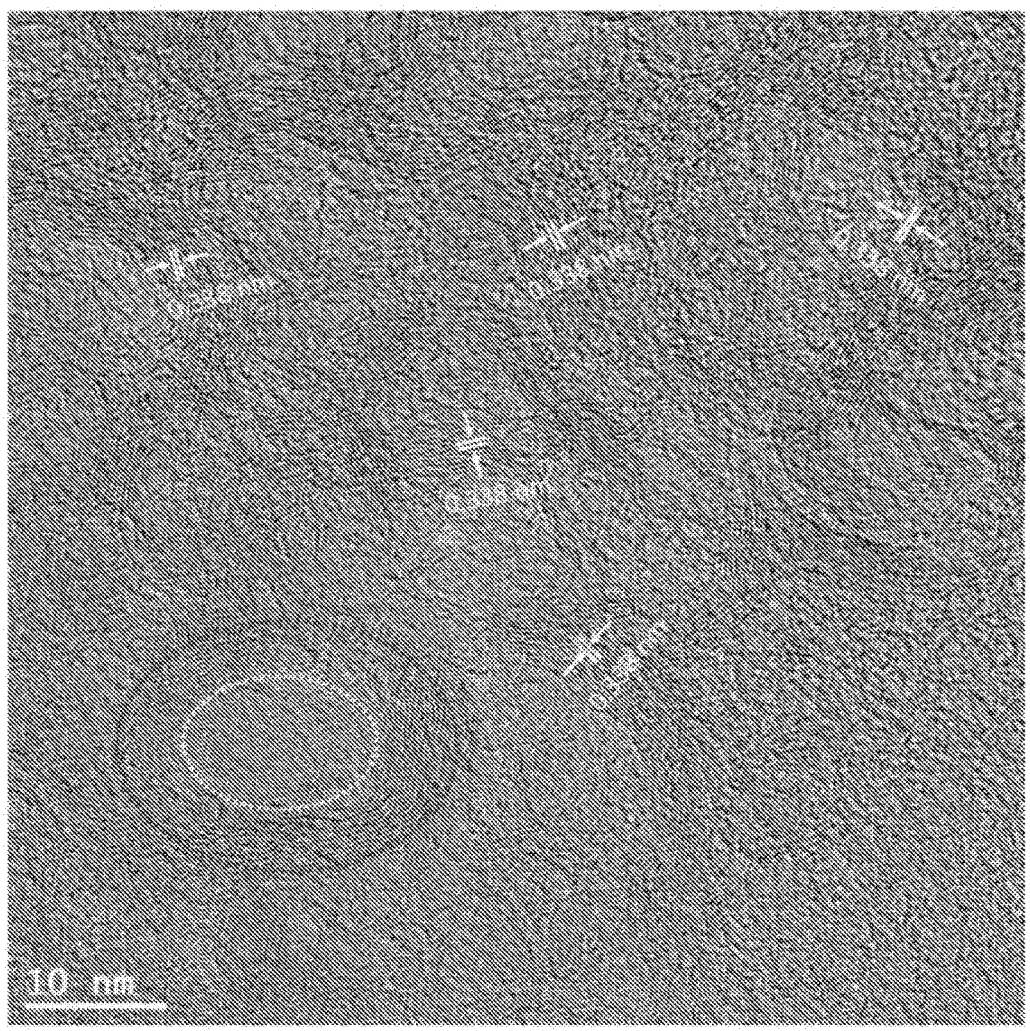
FIG. 28 is a HRTEM image of HNDCM-100,000-900 with (002) plane dominated concentric onion-like graphitic domains. Concentric onion-like graphitic nanostructures with multi-shells (red line) and hollow cages (yellow line) are observable in the HNDCM-100,000-900.
Figure 29:
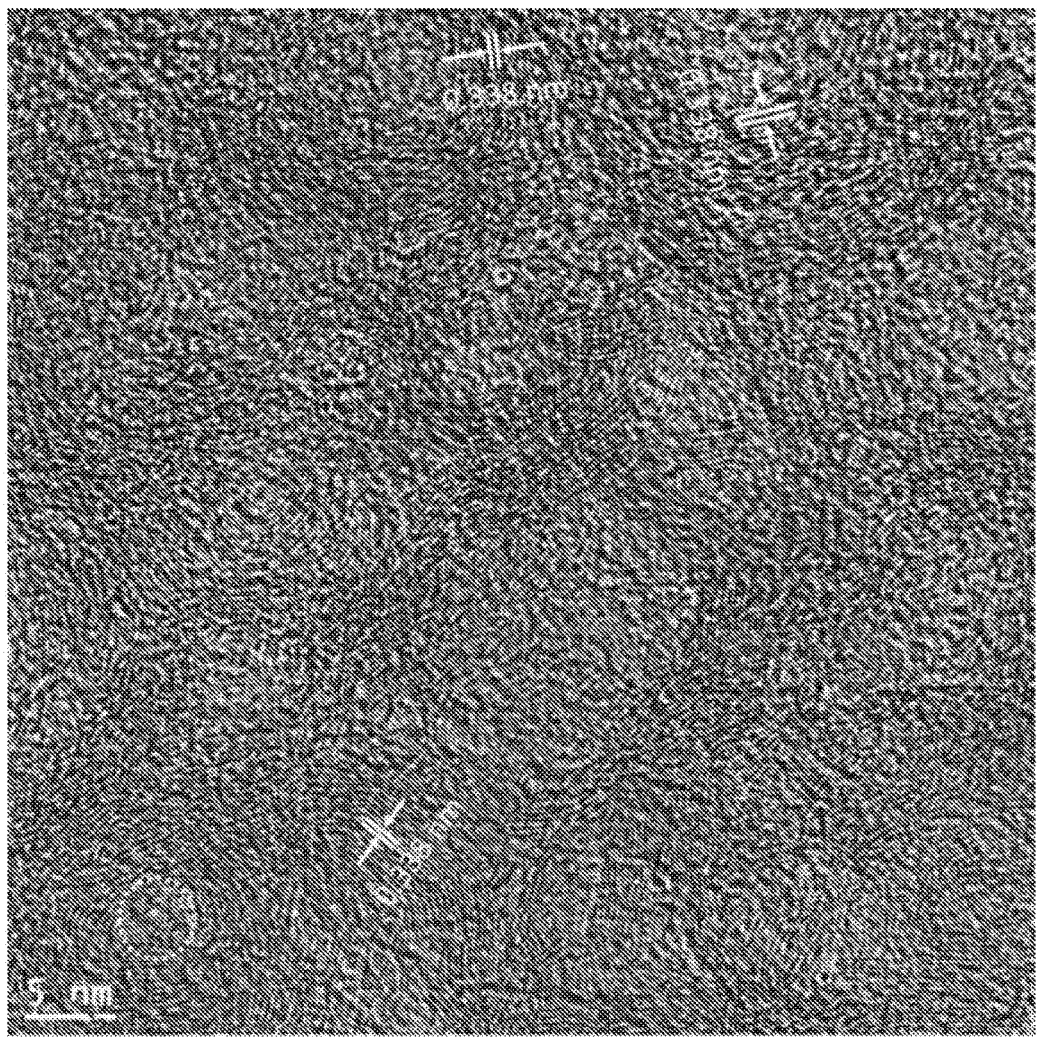
FIG. 29 is a HRTEM image of HNDCM-100,000-1000 with (002) plane dominated concentric onion-like graphitic nanostructures. It can be seen that the typical concentric onion-like graphitic nanostructures with multi-shells (outer dotted line) and hollow cages (inner dotted line) exist in HNDCM-100,000-1000.

In the HNDCM-100,000-900/1000 samples, single-crystal-like macropore walls (large graphite sheets) were observed composed of (101) planes, which consist of hexagonal rings as confirmed by the SAED pattern (inset in FIG. 1F). Interestingly, the concentric onion-like graphitic carbon is composed of (002) planes facing the pores. Furthermore, higher temperatures reduced the diameter of the hollow cages and introduced more shells in onion-like structures in HNDCMs (FIG. 28, 29). Graphite sheets are generally not stable with size shrinkage and tend to bend from (111) planes to rearrange into concentric graphitic shells because of the beneficial effect of symmetric and uniform strain distribution, abiding by the lowest energy available law (H. Kroto, Nature 329, 529-531 (1987)). On the basis of these analyses, the observed unique graphitic order in the HNDCM-1000-900/1000 samples likely results from the porous precursor that facilitates migration and recrystallization of carbon atoms into graphite along the (101) planes. The results suggest that graphitization already starts at temperature as low as 900° C. Owing to their small sizes, these (101) planes in the carbon membrane preferentially rearrange themselves into the lowest energetically stable morphology, i.e. the multi concentric shells with small hollow interiors.

Figures 3A, 3B, 3C, 3D:
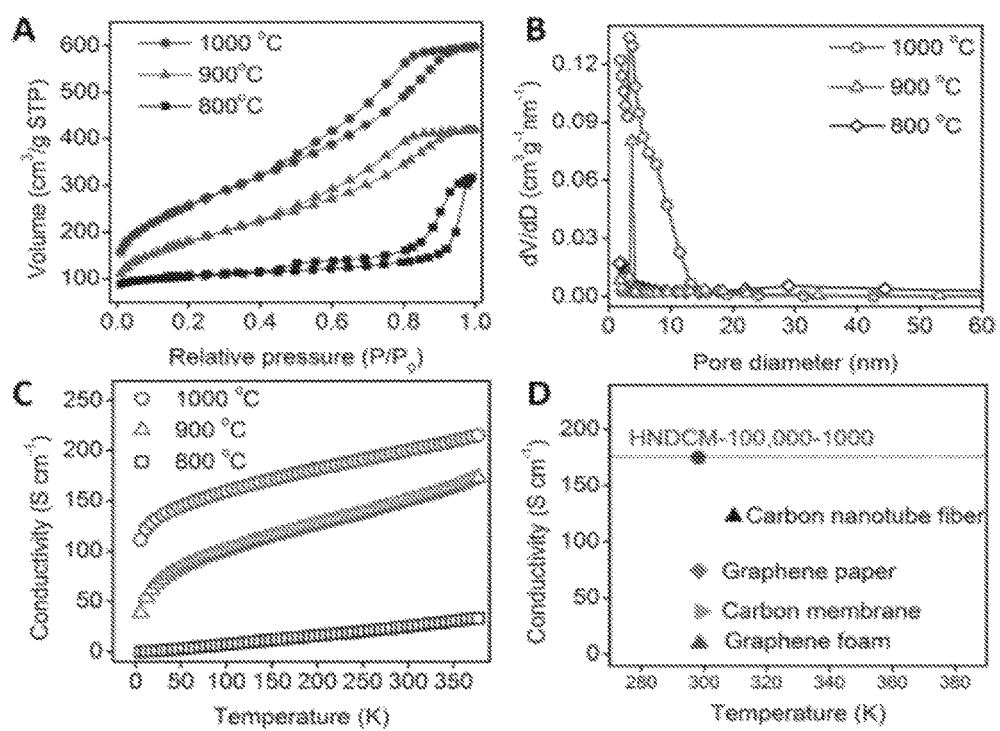
FIGS. 3A-3D show Brunauer-Emmett-Teller (BET) surface area and conductivity characterizations.

FIG. 3A shows the N$_2$ absorption-desorption isotherms of HNDCM-100,000-y (y=800, 900, 1000° C.), revealing that the pore volume and specific surface area (S$_{BET}$) increase significantly with increasing temperatures. S$_{BET}$ of HNDCM-100,000-800/-900/-1000 are 354, 632, and 907 m$^2$ g$^{-1}$, respectively, and their total pore volumes are 0.48, 0.61, and 0.79 cm$^3$ g$^{-1}$, respectively. The obvious hysteresis above P/P$_0$~0.5 is indicative of the existence of mesopores. Barrett-Joyner-Halenda (BJH) pore size distribution curves (FIG. 3B) derived from the N$_2$ sorption branches proves the presence of micropores (<2 nm) and mesopores smaller than 5 nm in HNDCM-100,000-1000 (the pore volume of micropores and mesopores are 0.048 and 0.74 cm$^3$ g$^{-1}$, respectively).

Tf$_2$N— is a micropore-forming agent. Herein, Tf$_2$N— constitutes 53.8 wt % of GPPM-100,000, as determined by elemental analysis (FIG. 30), and is thereby responsive for the formation of micropores and small mesopores. In such porous membranes with hierarchical architecture, micropores and small mesopores are of extra merits to provide active surface areas with high accessibility, while large mesopores and macropores form interconnected three-dimensional networks and serve as transport highways to accelerate the mass diffusion and to significantly promote the exchange efficiency. An advantage of the single-crystal graphite structure is the high conductivity of the carbon membranes in spite of their high pore volume.

For example, conductivity of HNDCM-100,000-1000 reaches the highest value of 200 S cm$^{-1}$ at 298 K, while it drops to 147 and 32 S cm$^{-1}$ at 298 K for HNDCM-100,000-900 and HNDCM-100,000-800, respectively. The high conductivity of such membranes is surprising considering the relatively low carbonization temperatures. More importantly, such high conductivity is appealing for a wide range of electrical applications. Furthermore, the conductivity of HNDCM-100,000-y (y=800, 900, 100) increases with temperature, indicative of a semiconductor-like behavior. (FIG. 3C). Notably, the conductivity of HNDCM-100,000-1000 is among the highest values ever reported on macroscopic carbon monoliths (FIG. 3D).

Figures 4A, 4B, 4C, 4D, 4E, 4F:
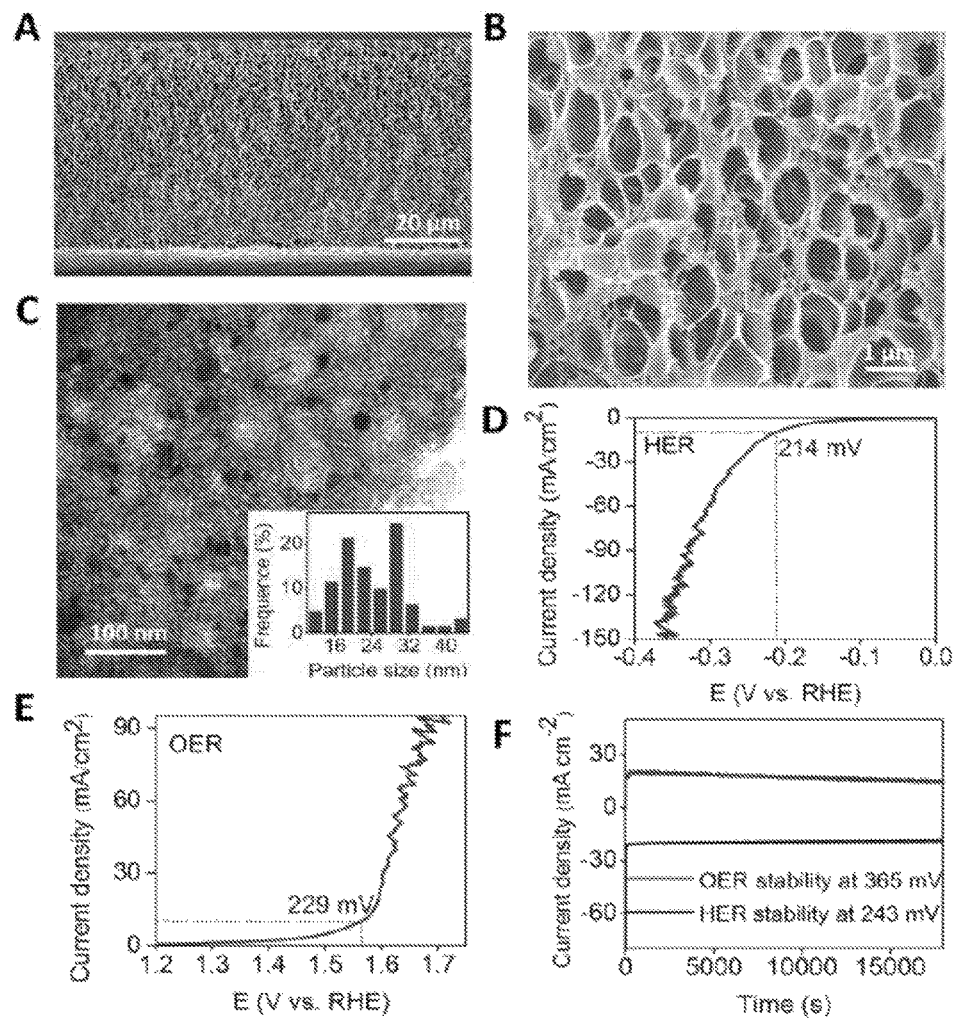
FIGS. 4A-4F show microstructures of HNDCM-100,000-1000/Co and water splitting performances.
Figure 31:
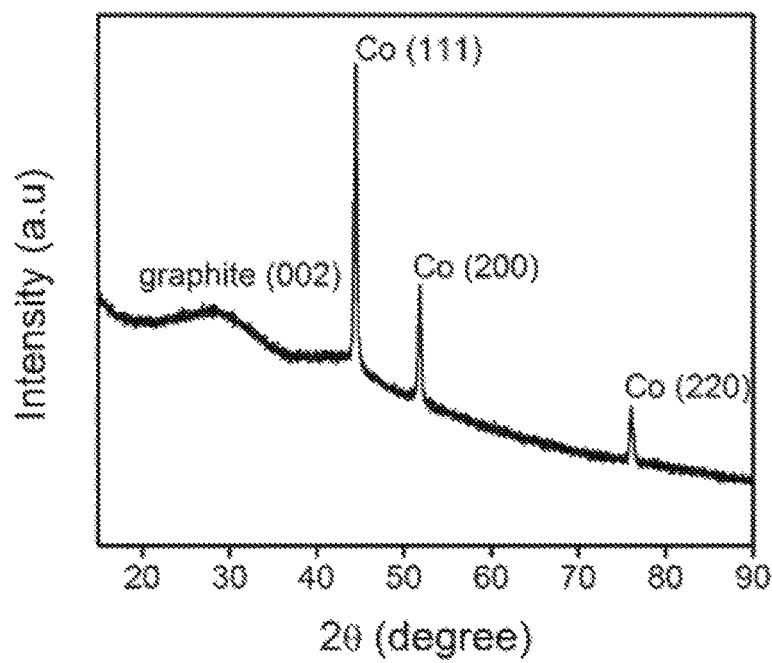
FIG. 31 is a graph showing XRD patterns of HNDCM-100,000-1000/Co.
Figure 32:
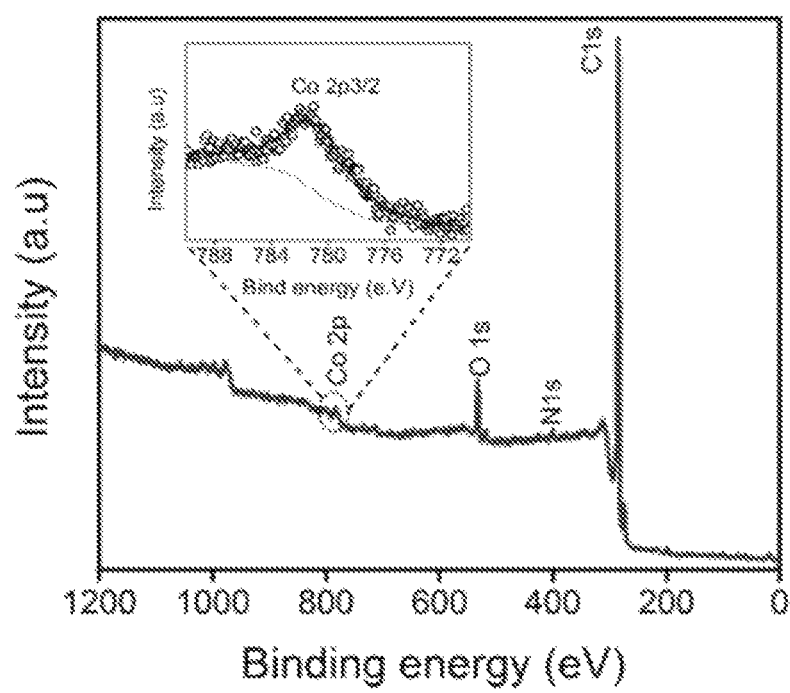
FIG. 32 is a graph showing XPS spectra of HNDCM-100,000-1000/Co, inset is the Co 2p3/2 peak.
Figure 33:
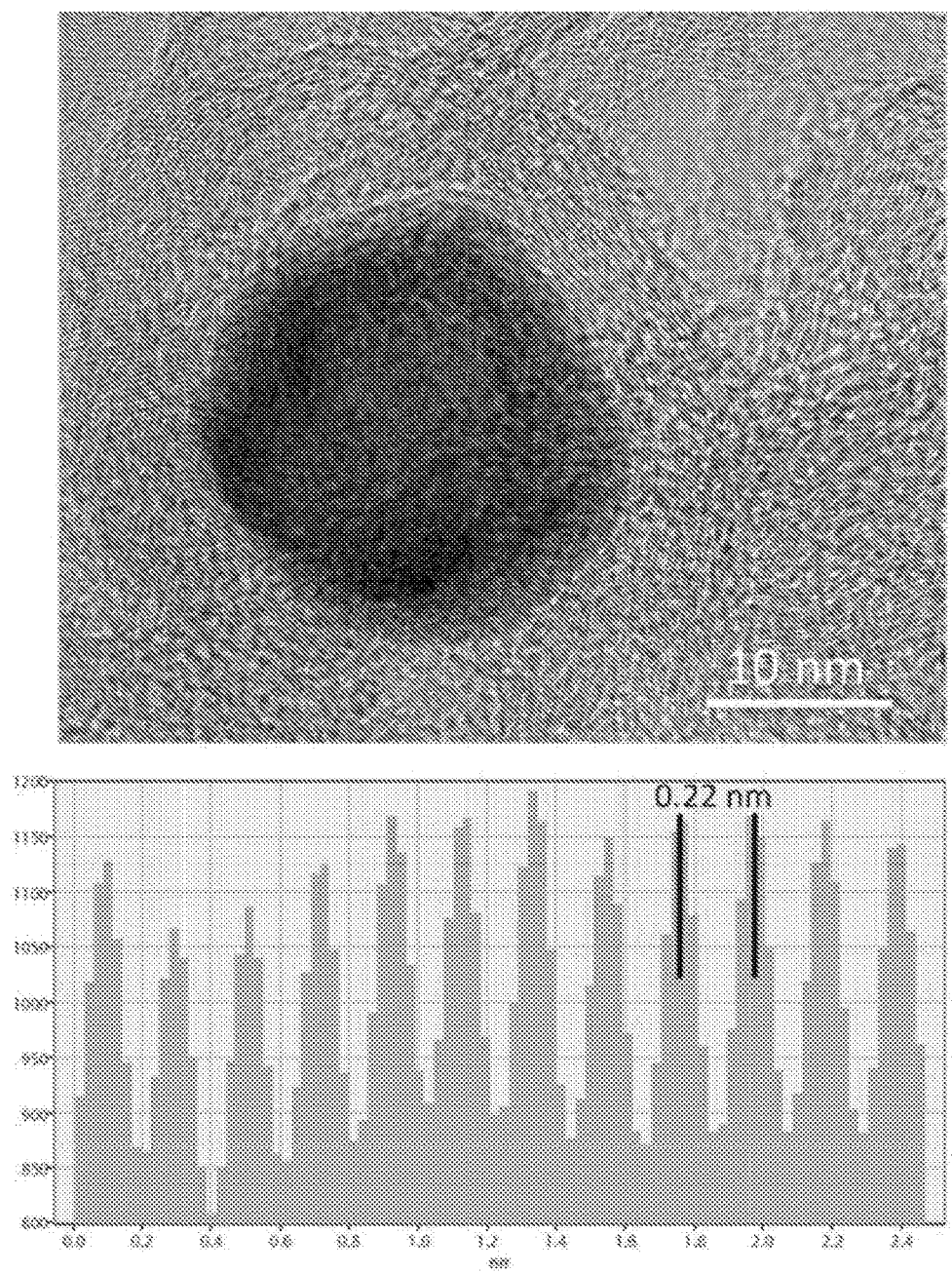
FIG. 33 shows a HRTEM image of Co nanoparticle surrounded by N doped graphite (up); The lattice d-spacing of 0.22 nm is corresponding to the {101$\overline{1}$0} plane in hcp-Co (down).

Cobalt nanoparticles embedded in HNDCM-100,000-1000 (HNDDC-100,000-1000/Co) was investigated as highly active bifunctional electrocatalyst for overall water splitting in alkaline media. HNDCM-100,000-1000/Co was chosen as example due to its favorable high electron conductivity and large surface area. It was prepared by carbonization of GPPM-100,000-cobalt acetate mixture precursor under N$_2$ atmosphere at 1000° C. Its XRD pattern in FIG. 31 reveals the characteristic peaks of only graphitic phase and metallic cobalt, free of peaks from cobalt oxides, which was further confirmed by XPS spectra (FIG. 32). The formation of Co nanoparticles presumably involved the decomposition of cobalt acetate and the subsequent carbothermal reduction of CoO intermediate. SEM images (FIG. 4A-B) of HNDCM-100,000-1000/Co suggest that the pore architectures of the HNDCM is preserved during the carbonization in the presence of cobalt acetate. As shown in FIG. 4C, Co nanoparticles are uniformly distributed throughout the carbon membrane. The size distribution displays a mean diameter of ~30 nm with a standard size deviation of about 10% (FIG. 4C, inset). Interestingly, HRTEM images (FIG. 33) show that the Co nanoparticles were covered by a thin graphite carbon shell of several nm in thickness, which is beneficial to improve the stability of HNDCM-100,000-1000/Co in electrochemical reactions.

The electrocatalytic performances of HNDCM-100,000-1000/Co were evaluated in 1 M KOH for both HER and OER. FIG. 4D shows the polarization curves obtained from linear sweep voltammetry (LSV) measurements, a slow sweep rate of 1 mV·s$^{-1}$ was used in order to eliminate any capacitance effect. HNDCM-100,000-1000/Co was found to exhibit high activity for HER, giving a current density of 10 mA/cm$^2$ at a relatively small overpotential of 214 mV, which is significantly lower than that previously reported for Co/N-doped carbon nanotube catalyst, and is comparable or even superior to many other non-noble metal catalysts (Table 3).

TABLE 3

HER performance of HNDCM-100,000-1000/Co in this work, in comparison with several representative results with high performance non-noble metal based catalysts.

| Catalyst | Current density j (mA cm$^{-2}$) | Overpotential (vs. RHE) at the corresponding j | Condition | References |
|---|---|---|---|---|
| MoB | 10 | 225 mV | alkaline | Angew. Chem., Int. Ed. 51, (12703-12706) 2012 |
| MoC | 10 | >250 mV | alkaline | Angew. Chem. Int. Ed. 126, (6525-6528), 2014 |
| Co-NRCNT | 10 | 370 mV | alkaline | Angew. Chem., Int. Ed., 53, (4372) 2014 |
| HNDCM-100,000-1000/Co | 10 | 214 mV | alkaline | This work |
| CoOx@CN | 10 | 232 mV | alkaline | J. Am. Chem. Soc. 137, (2688-2694) 2015 |
| Nanoporous MoS$_2$ | 10 | 270 mV | acid | Nature Mater. 11, (963-969) 2012 |
| Au supported MoS$_2$ | 0.2 | 150 mV | acid | Science 317, (100-102) 2007 |
| Exfoliated WS$_2$/MoS$_2$ nanosheets | 10 | 187-210 mV | acid | Nature Mater. 12, (850-855) 2013; J. Am. Chem. Soc. 135, (10274-10277) 2013 |
| MnNi | 10 | 360 mV | Alkaline | Adv. Funct. Mater. 25, (393-399) 2015 |

Figures 34A, 34B:
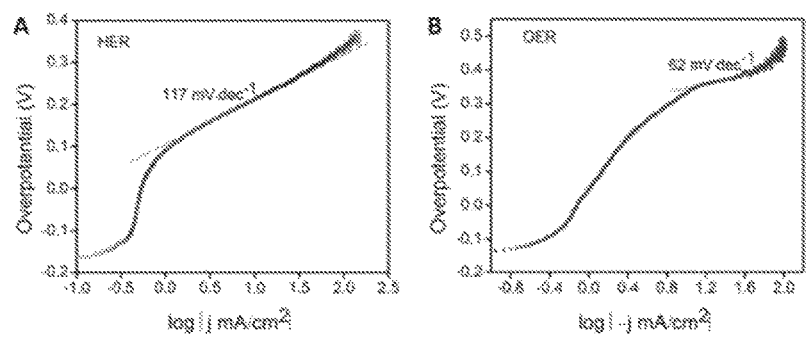
FIGS. 34A and 34B are graphs showing tafel plots of hydrogen evolution reaction (HER) (FIG. 34A) and oxygen evolution reaction (OER) (FIG. 34B) currents.

The Tafel slope extracted from the LSV curve was found to be 117 mV·dec$^{-1}$ (FIG. 34), indicating that the HER driven by this catalyst is controlled by a Volmer-Heyrovsky mechanism. FIG. 4E shows the LSV curve for OER. Here, an extremely small over-potential of 229 mV is required to reach a current density of 10 mA·cm$^{-2}$, while the Tafel slope is as small as 62 mV·dec$^{-1}$ (FIG. 34). These values outperform previous reports on Co or CoOx/carbon hybrids catalyst for OER. It is worth noting that the Co loading in the catalyst is as low as 0.48 mg/g or 0.05 wt % (determined by inductively coupled plasma-atomic emission spectra). Thus the high catalytic activity of the catalyst for HER and OER is believed to be a synergy of its high conductivity, nitrogen-doping, hierarchical pore architecture as well as the high dispersion of active Co catalyst in HNDCM-100,000-1000. Most importantly, unlike previously reported HER electrocatalysts, there is no performance degradation induced by bubble trapping for the catalyst because of the rapid mass transfer throughout the hierarchical pore architectures, but presumably also a result of bubble repelling surface nanostructures. It is noted that the "noise" in LSV curves of HER and OER is generated by perturbations of the membrane catalyst due to the release of large amounts of H$_2$ and O$_2$ bubbles produced at higher over-potentials.

Figures 35A, 35B:
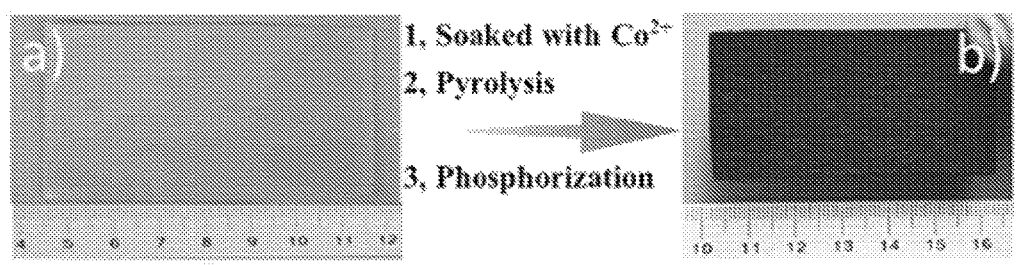
FIG. 35A-35B is a schematic illustration of preparation of nitrogen-doped porous carbon membranes functionalized with Co/CoP Janus nanocrystals.
Figures 36A, 36B, 36C:
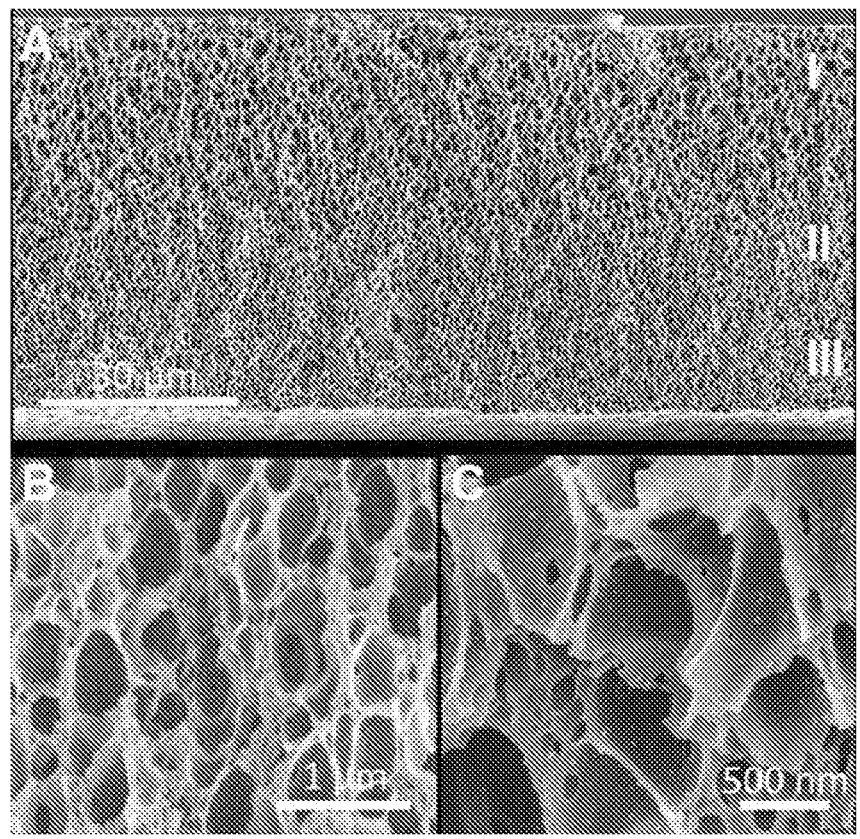
FIGS. 36A-36C are cross-sectional SEM images of nitrogen-doped porous carbon membranes functionalized with Co/CoP Janus nanocrystals.

Example 2. Production of Nitrogen-Doped Nanoporous Carbon Membranes Functionalized with Co/CoP Janus Nanocrystals The synthesis of targeted HER electro-catalyst HNDCM-Co/CoP is displayed in FIG. 35A, in which a NPPM built up by interpolyelectrolyte complexation was used as a sacrificial soft template. A key feature of interpolyelectrolyte complexes is their function to bind and immobilize metal ions, salts, and charged nanoparticles, which allows for facile functionalization of the NPPM for desirable purposes. Co salt was chosen for the functionalization because a Co surface has a low energy barrier for H adsorption. FIGS. 36A-36C show the cross-sectional SEM images of the HNDCM-Co/CoP hybrid membrane, in which a gradient of size distribution in the macropores is observable. The average macropore size in zone I, zone II, and zone III are 1.6 µm, 850 nm and 550 nm, respectively. That is, the average macropore size decreases from top to bottom. A three dimensionally interconnected cellular architecture is shown in an enlarged SEM image in FIG. 36B. The holes in the pore wall can be identified in a close view in FIG. 36C. On the pore surface, the multiple metal nanocrystals are seen as multiple light dots, which are uniformly dispersed.

Figures 37A, 37B, 37C, 37D:
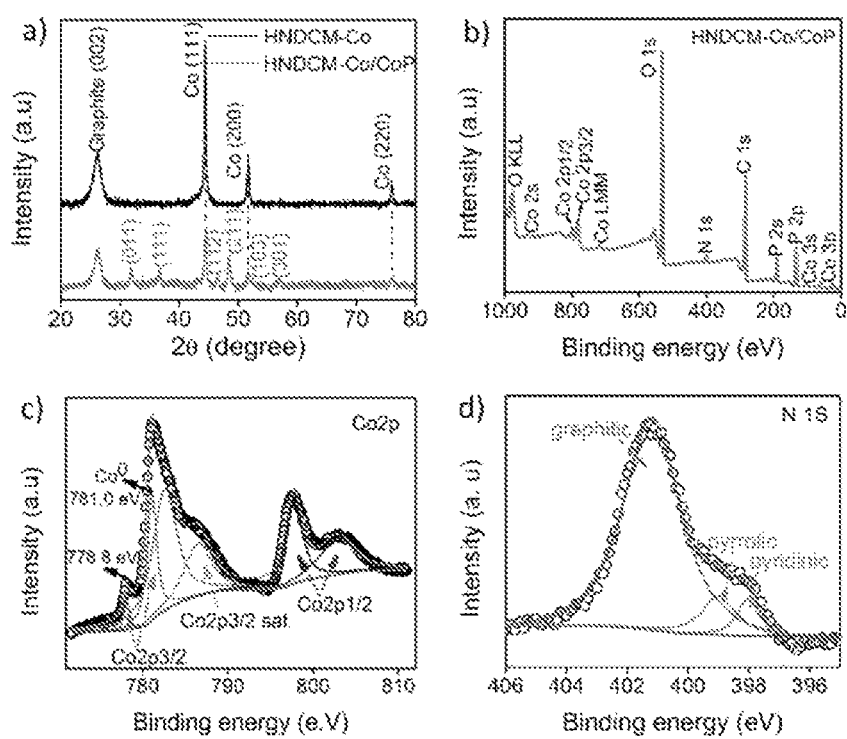
FIGS. 37A-37D are graphs of XRD patterns of HNDCM-Co and HNDCM-Co/CoP (FIG. 37A), XPS spectrum of HNDCM-Co/CoP (FIG. 37B), XPS spectra of Co 2p (FIG. 37C) and N is (FIG. 37D).

The phase structure of HNDCM-Co/CoP was analyzed by X-ray diffraction (XRD) and X-ray photoelectron spectroscopy (XPS). FIG. 37A shows XRD patterns of HNDCM-Co and HNDCM-Co/CoP. The four peaks appearing in HNDCM-Co at 26°, 44°, 52° and 76° were indexed to the (002) reflections of hexagonal graphite, metallic Co (111), Co (200) and Co (220), respectively. No other Co phase was identified. After the phosphorization step to grow CoP, extra peaks at 32°, 36°, 46°, 48°, 52°, and 58° are observed in HNDCM-Co/CoP, which are assigned to the (011), (111), (112), (211), (103), and (301) planes of CoP. Indeed the XRD characterization proves that CoP was incorporated into the hybrid membrane. The XPS spectrum of HNDCM-Co/CoP (FIG. 37B) shows the presence of Co, P, C, and N elements. Its Co 2p high resolution XPS spectrum (FIG. 37C) is deconvoluted into two core-level signals, which are located at 780 and 796 eV, corresponding to Co2p3/2 and Co2p1/2, respectively. The peak at 781.0 eV is characteristic of CoO, and the peak at 778.8 eV is typically assigned to the binding energies of Co 2p3/2 in CoP nanocrystal (Yang et al., Nano Energy 15, 634 (2015)). The analysis here thus confirms the metallic Co and CoP coexist in the membrane. The N 1s peak (FIG. 37D) can be deconvoluted into three different bands, 398.1, 399.5, and 400.7 eV, corresponding to the pyridinic (5.2%), pyrrolic (8.9%) and graphitic (85.9%), respectively. The content of N in NHDCM-Co/CoP is 5.4 wt % as determined by elemental analysis.

Figures 38A, 38B, 38C, 38D:
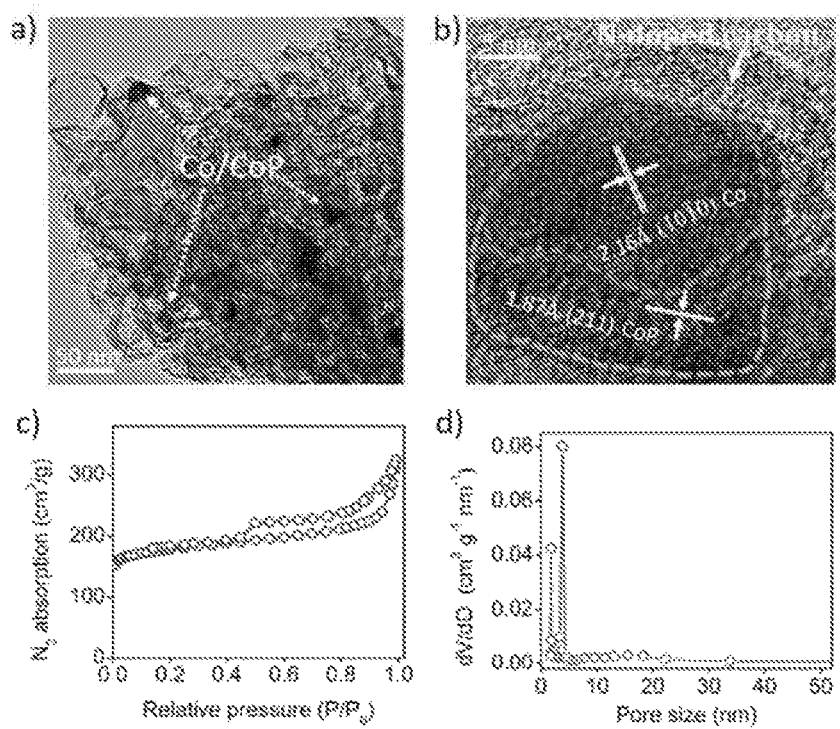
FIG. 38A shows a TEM image of HNDCM-Co/CoP.
FIG. 38B shows a HRTEM image of CoP/Co nanocrystal inlaid N-doped carbon membrane.
FIG. 38C is a graph of nitrogen absorption-desorption isotherms.
FIG. 38D is a graph of corresponding pore size distribution of HNDCM-Co/CoP.

Transmission electron microscopy (TEM) further shows the porous structure of the HNDCM-Co/CoP and the uniform distribution of Co/CoP nanocrystals (seen as darker dots in FIG. 38A) throughout the entire membrane. HRTEM in FIG. 38B is an enlarged view of a single Co/CoP nanocrystal, which is protected by a visible graphitic layer. The atomic ordering in the nanocrystal was carefully analyzed. The inner dotted line encircles an inner area is composed of pure metallic Co with a lattice d-spacing of 2.16 Å, corresponding to the {1010} plane of fcp Co, whereas the outer dotted line encircles an outer area having CoP with a lattice d-spacing of 1.87 Å, corresponding to the (211) plane of CoP, i.e., the nanocrystal is a Janus-like nanoparticle. Elemental P exists dominantly in the outer zone (CoP phase) rather than in the inner area, i.e., the Co core. All of these results point out that Janus-type Co/CoP nanocrystals were formed and embedded in the porous carbon membrane via the low-temperature phosphatization of HNDCM-Co.

The Brunauer-Emmett-Teller (BET) specific surface area of HNDCM-Co/CoP was determined by nitrogen gas sorption to be 589 m$^2$/g (FIG. 38C). The Barrett-Joyner-Halenda (BJH) pore size distribution curve (FIG. 38D) derived from the N$_2$ adsorption branch confirms the presence of micropores (<2 nm) and small mesopores less than 5 nm. Pore volumes of the micropores and mesopores were 0.07 and 0.58 cm$^2$ g$^{-1}$, respectively. These pores were too small to be identified by SEM and TEM characterization. The porous carbon membrane features not only a gradient in the pore size distribution of the macropores along its cross-section but also simultaneously a hierarchical pore architecture covering the micropore to mesopore range. The large macropores provide diffusion highways while the micropores and mesopores offer a large surface area bearing active sites to undergo reactions. It should be noted that the optimized pore features in the porous carbon membrane are obtained in a single carbonization step without any post-synthesis treatment, such as activation. Owing to the high conductivity, satisfactory BET surface area, hierarchical pore architecture as well as evenly dispersed active Co/CoP species, the structure of HNDCM-Co/CoP is well suited to support many electrochemical processes, such as water splitting.

Figures 39A, 39B, 39C, 39D:
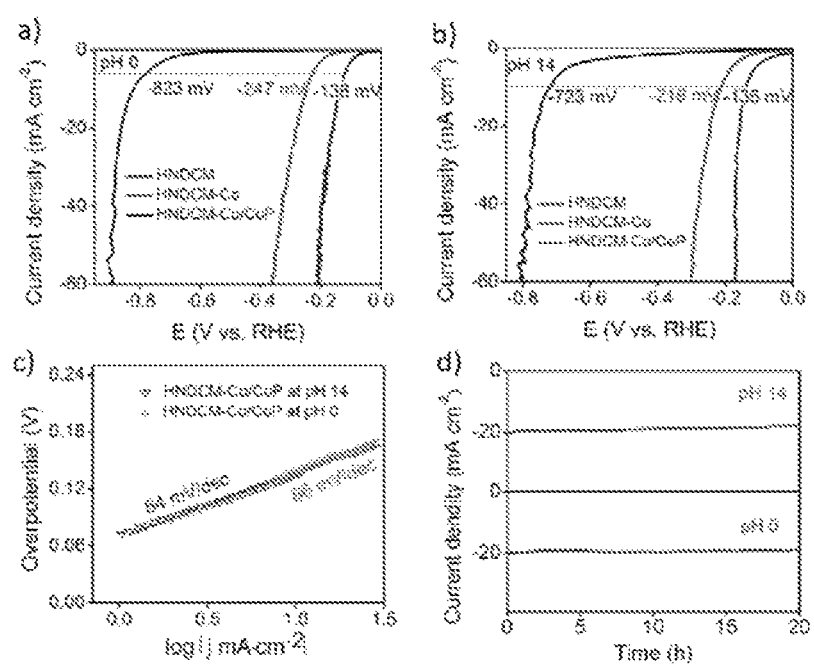
FIGS. 39A-39B are graphs of HER performance of HNDCM, HNDCM-Co and HNDCM-Co/CoP in 0.5 M H$_2$SO$_4$ (FIG. 39A) and 1 M KOH (FIG. 39B).
FIG. 39C shows a Tafel curve of HNDCM-Co/CoP in acidic and alkaline conditions.
FIG. 39D is graph showing the stability of HNDCM-Co/CoP in 0.5 M H$_2$SO$_4$ (pH 0) and 1 M KOH (pH 14).

The HER activity of HNDCM-Co/CoP was evaluated by a standard three-electrode electrochemical cell in both acid and alkaline conditions and was compared with metal-free carbon membrane HNDCM, and Co nanoparticle functionalized carbon membrane HNDCM-Co. The size and thinness of the three electrocatalysts were equal. All HER data has been corrected based on impedance spectroscopy, as shown in FIG. 39. At 10 mA/cm$^2$, HNDCM and HNDCM-Co exhibited an overpotential of 823 and 247 mV, respectively. Under the same condition, HNDCM-Co/CoP showed the lowest overpotential of 138 mV, which is in fact among the best non-noble-metal electrocatalysts reported so far for HER (Table 4). In a basic environment, here in 1 M KOH (pH 14), the LSV curves (FIG. 39B) present an overpotential of 723 and 216 mV, respectively, for HNDCM and HNDCM-Co at 10 mA/cm$^2$, which are slightly lower than that in acid condition. It indicates alkaline conditions are more favorable for these default samples than acidic conditions for a HER operation. By contrast, HNDCM-Co/CoP requires an overpotential as low as 135 mV, close to that in acidic condition. Thus far, there are very rare electrocatalysts active in both acid and alkaline conditions due to the incompatibility of the activity of the same electrocatalyst operating in the same pH region. In our case, the excellent HER activity of HNDCM-Co/CoP in alkaline condition can be potentially attributed to the bi-phasic character of Co and CoP in Janus nanocrystals.

The Tafel slopes of HNDCM-Co/CoP are determined to be approximately 64 and 66 mV decade$^{-1}$ in 0.5 M $H_2SO_4$ and 1M KOH, respectively (FIG. 39C). This result suggests the HER over HNDCM-Co/CoP is controlled by a Volmer-Heyrovsky mechanism in both acid and alkaline conditions. Additionally, stability of electrocatalysts in practical operation is a key parameter. The long-term electrochemical stability of HNDCM-Co/CoP for HER in both acid and alkaline conditions (FIG. 39D) showed no decay after continuously working for 20 h.

Figures 40A, 40B:
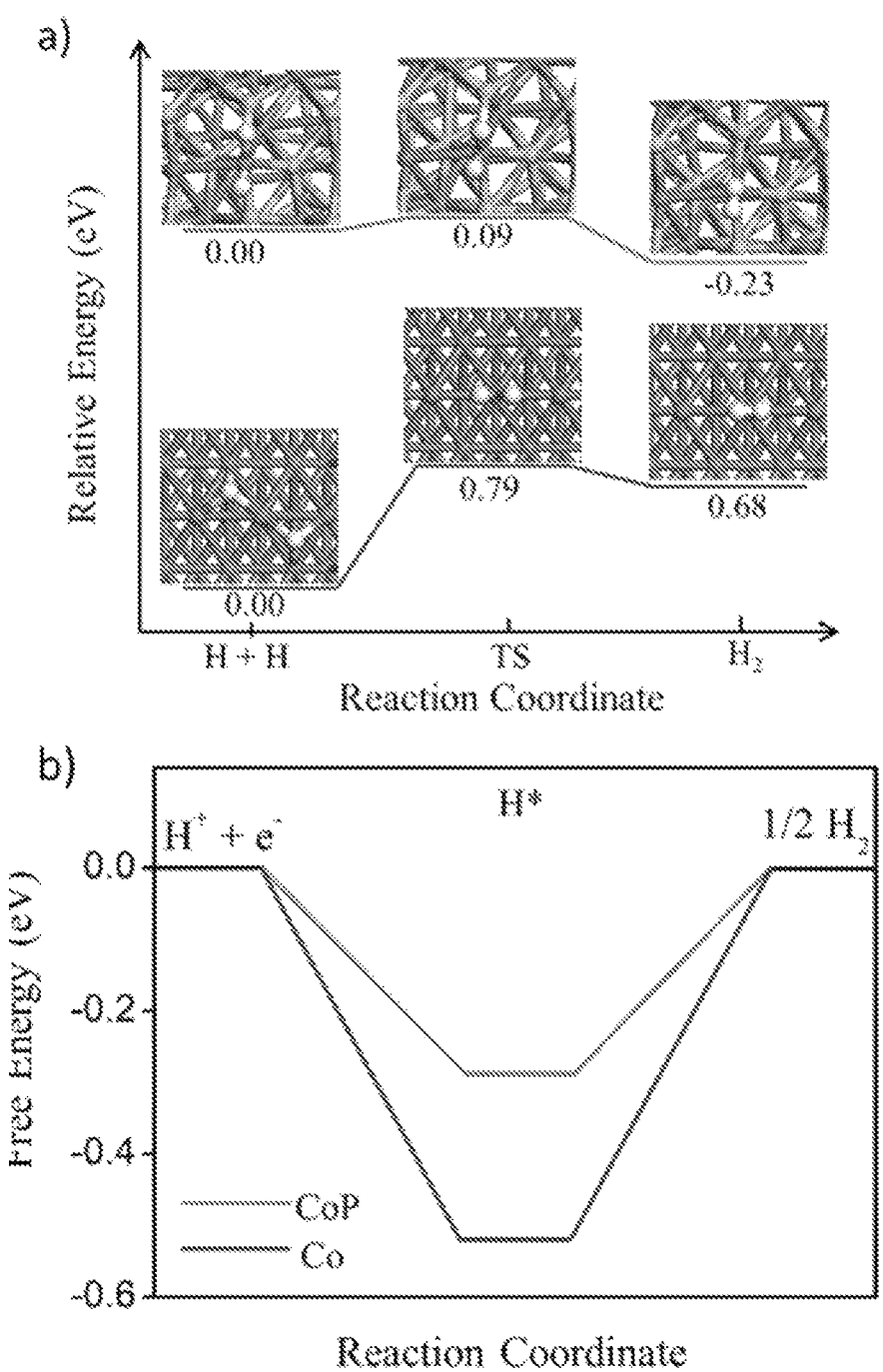
FIGS. 40A-40B are graphs of the kinetic energy barrier profiles of HER on CoP (211) and Co (101) surfaces (FIG. 40A). The blue, pink, and white spheres represent Co, P, and H atoms, respectively.

To understand the electrocatalysis reaction mechanism of Co and CoP in Janus-type nanocrystal and their high HER performance of HNDCM-Co/CoP, density functional theory (DFT) calculations were carried out. The hydrogen generation process was as follows: a proton was first adsorbed on a surface, then a second proton ($H^+$) gets close to the adsorbed proton ($H_{ad}$) to form an adsorbed $H_2$, the absorbed $H_2$ finally makes its way to desorption (FIG. 40A). This process including adsorption, activation and the reaction energy-barrier specifically on the Co (1010) and CoP (211) planes was studied further. Co(1010) is the active site in Co and the CoP (211) plane is chosen as it is structurally similar to $Ni_2P$. The $Ni_2P$ (211) surface was previously reported to be very active. As can been seen in FIG. 40A, the energy barrier for this step is calculated to only 0.09 eV on the CoP (211) surface, which is much lower than that on the Co (101 0) surface (0.79 eV). More importantly, this process changes the released energy for the formation of $H_2$ from endothermic 0.68 eV on Co (1010) to exothermic −0.23 eV on CoP (211) and is thus thermodynamically favored. Equally important, a good catalyst of the HER should have a moderate free energy for H adsorption ($\Delta G H^*$) to compromise the reaction barriers of the adsorption and desorption steps. Calculations as shown in FIG. 40B indicate that the $\Delta G H^*$ value of Co is 0.52 eV, which is nearly the same to that of $CO_3S_4$ 0.53 eV. Thus, the high catalytic activity of the HNDCM-Co/CoP in both acid and alkaline conditions is a natural outcome of the suitable energy barrier of Co for $H^+$ adsorption and the higher exothermicity of CoP for $H_2$ formation, both of which were confined and coupled in a Janus-type nanocrystal.

TABLE 4

HER performance of HNDCM-Co/CoP in this work, in comparison with several representative results with high performance non-noble metal based catalysts from recent publications.

| Catalyst | Current density j (mA cm$^{-2}$) | Overpotential (vs. RHE) at the corresponding j | Condition | References |
|---|---|---|---|---|
| MoB | 10 | 225 mV | alkaline | Angew. Chem., Int. Ed. 2012, 51, 12703-12706. (S1) |
| MoC | 10 | >250 mV | alkaline | Angew. Chem. Int. Ed. 2014, 126, 6525-6528. (S2) |
| Co-NRCNT | 10 | 370 mV<br>280 mV | alkaline<br>acid | Angew. Chem., Int. Ed. 2014, 53, 4461-4465. (S3) |
| CoO$_x$@CN | 10 | 232 mV | alkaline | J. Am. Chem. Soc. 2015, 137, 2688-2694. (S4) |
| Nanoporous MoS$_2$ | 10 | 270 mV | acid | Nature Mater. 2012, 11, 963-969. (S5) |
| Au supported MoS$_2$ | 0.2 | 150 mV | acid | Science 2007, 317, 100-102. (S6) |
| Co—C—N Complex | | 138 mV | acid | J. Am. Chem. Soc. 2015, 137, 15070-15073. (S7) |
| Exfoliated WS$_2$/MoS$_2$ nanosheets | 10 | 187-210 mV | acid | Nature Mater. 2013, 12, 850-855. (S8); J. Am. Chem. Soc. 2013, 135, 10274-10277. (S9) |
| MoS$_2$/Graphene | 10 | 150 mV | acid | J. Am. Chem. Soc. 2011, 133, 7296-7299. (S10) |
| Oxygen-incorporated MoS$_2$ nanosheets | 10 | 180 mV | acid | J. Am. Chem. Soc. 2013, 135, 17881-17888. (S11) |
| Co$_{0.6}$Mo$_{1.4}$N$_2$ | 10 | 200 mV | acid | J. Am. Chem. Soc. 2013, 135, 19186-19192. (S12) |
| MoP | 10 | ~150 mV | acid | Energy Environ. Sci. 2014, 7, 2624-2629. (S13) |
| CoSe$_2$ Nanoparticles/ Carbon fiber paper | 10 | 137 mV | acid | J. Am. Chem. Soc. 2014, 136, 4897-4900. (S14) |
| Ni$_{43}$Au$_{57}$ nanoparticles/ carbon | 10 | ~200 mV | acid | J. Am. Chem. Soc. 2015, 137, 5859-5862. (S15) |
| MnNi | 10 | 360 mV | Alkaline | Adv. Funct. Mater. 2015, 25, 393-399. (S16) |
| HNDCM-Co/CoP | 10 | 138 mV<br>135 mV | Alkaline<br>acid | In this work |

Figures 41A, 41B, 41C:
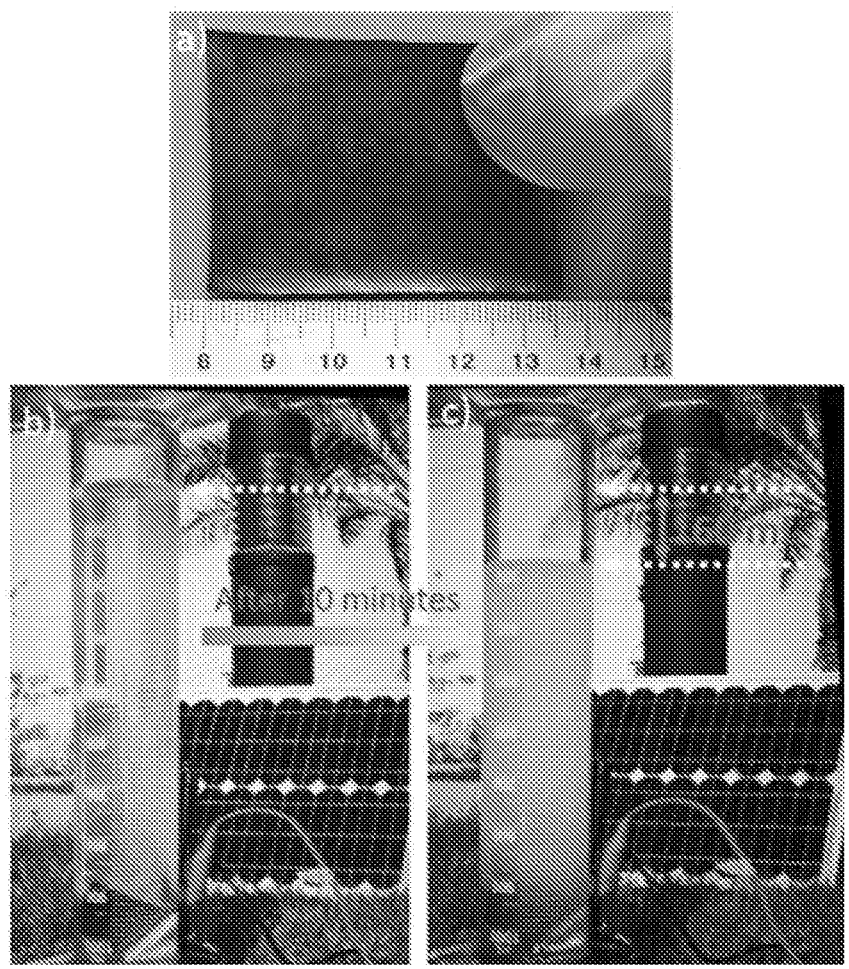
FIG. 41A is a photograph of a hybrid membrane HNDCM-Co/CoP with a size of 5.6×4 cm$^2$ and a thinness of 60 μm.
FIG. 41B-C are photographs of a HER driven by a solar cell containing the hybrid membrane in 1 M KOH before (FIG. 41B) and after (FIG. 41C) oxygen is released from a carbon plate as a counter electrode.

Example 3. Scaled-Up Production of Nitrogen-Doped Nanoporous Carbon Membranes The freestanding membrane-type HER electrode was also scaled up. For the solar-driven electrolysis of water, a large piece of HNDCM-Co/CoP of 5.6×4 cm$^2$ in size and 60 μm in thickness (FIG. 41A) was prepared and driven by a solar panel for HER in 1 M KOH, at output voltage of non-regulated, fluctuating 20 V. This membrane was produced in a laboratory carbonization oven, which can be essentially any larger size given a corresponding oven is provided. FIGS. 41B and 41C show the aqueous alkaline electrolyte level changes before and after HER, respectively. Within 10 min, 160 mL H$_2$ could be collected, signifying HNDCM-Co/CoP produces H$_2$ in a clean and efficient manner.

Figures 42A, 42B, 42C, 42D:
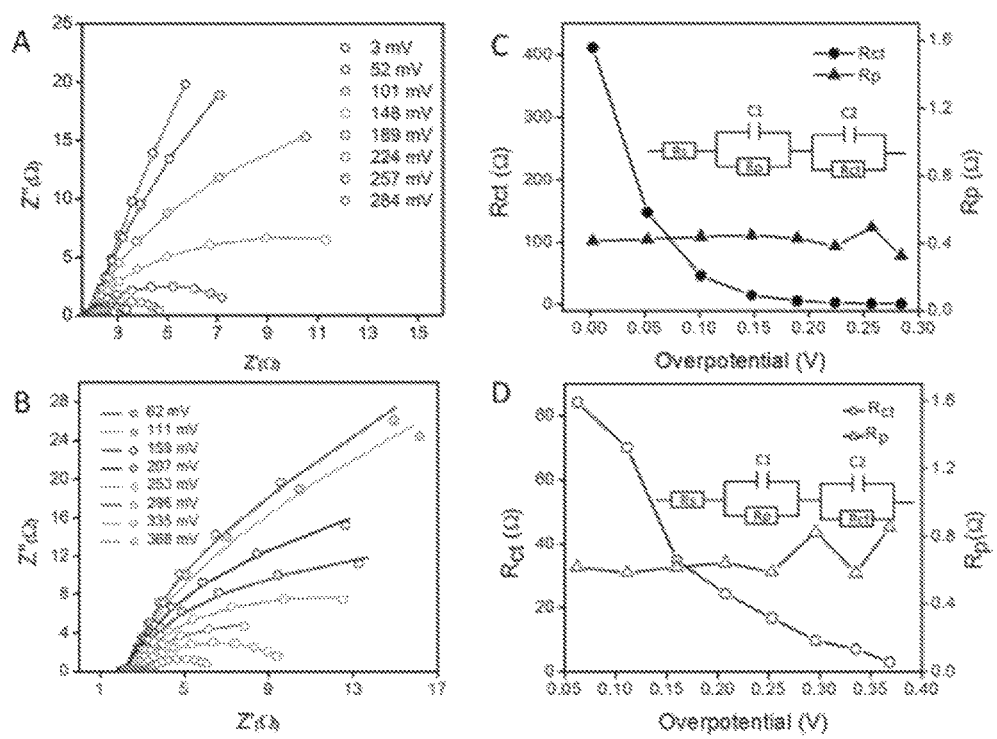
FIGS. 42A-42B are graphs of Nyquist plots of HNDCM-100,000-1000/Co for HER (FIG. 42A) and OER (FIG. 42B) at different overpotentials.
FIGS. 42C-D show the fitting data of R$_p$ and R$_{ct}$ as a function of overpotentials in HER (FIG. 42C) and OER (FIG. 42D).

To get further insights into catalytic kinetics for HER and OER, electrochemical impedance spectroscopy (EIS) measurements were performed at different overpotentials, as shown in FIG. 42. A frequency scan from 0.01 Hz to 200 kHz produced compressed semicircles in the Nyquist plot. A modified Randles circuit (FIG. 42C inset) with a constant-phase element was used to study the electrode-electrolyte interface. The semicircles in the high-to-low frequency ranges of the Nyquist plots could be attributed to the series resistance R$_s$, pore resistance R$_p$, and charge-transfer resistance R$_{ct}$, respectively. The overpotential-independent behaviors of R$_p$ for both HER (~0.4 Ω/cm$^2$) and OER (~0.6 Ω/cm$^2$) show the robust nature of the hierarchical pore structures of the catalyst even at high overpotentials, which also serve as efficient channels to overcome the mass transportation limitations and to provide more accessible exposed active sites. In addition, HNDCM-100,000-1000/Co exhibits a much lower R$_{ct}$ for both HER (0.047Ω at 224 mV) and OER (7.04Ω at 335 mV) than previously reported catalysts, indicating the fast charge transfer during the reactions due to the highly conductive nature of carbon membranes. At a current density of 10 mA/cm$^2$, the electrolyzer efficiency can be calculated to be 73.5%, which is the highest value for non-noble-metal-based catalysts. Generally, for powderous catalysts, polymer binders are used for processing the catalyst films onto conductive substrates, which, however, was avoided herein. Moreover, vigorous gas production usually delaminates the active materials from the electrodes due to the weakening of the binder, resulting in instability in their long-term operations. In contrast, the freestanding membrane-catalyst is free of any polymer binders, exhibits fairly high stability for HER and OER, and is thereby standing out as a promising bifunctional catalyst for scalable H$_2$ and O$_2$ production.

Figure 43:
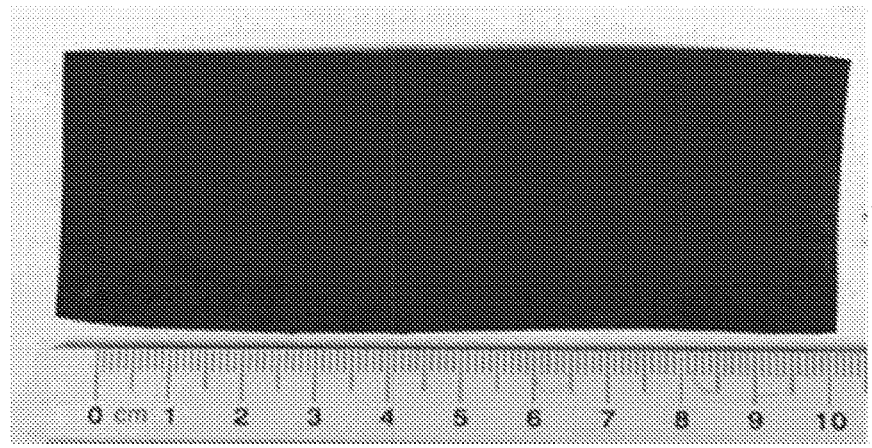
FIG. 43 is an image of a large piece of HNDCM-100,000-1000/Co catalyst with the size of 10.5×3.5 cm$^2$ and thickness of ~70 μm. This membrane is the largest one that prepared using the local carbonization oven at 1000° C.
Figure 44:
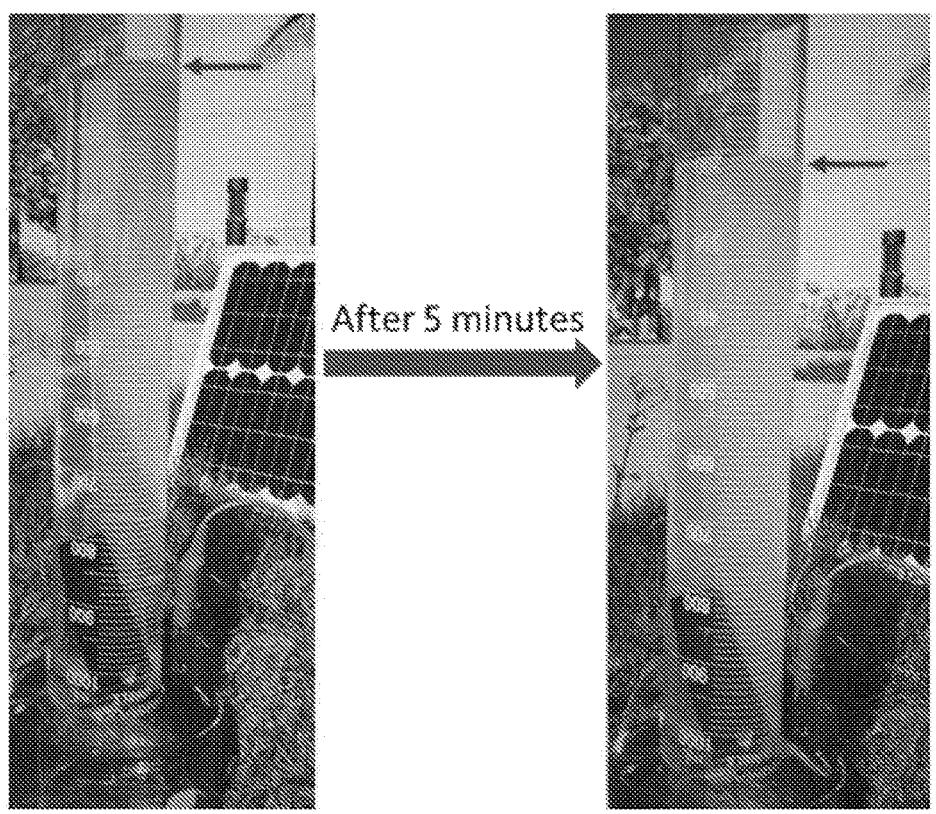
FIG. 44 are photographs showing before and after HER driven by solar cell in 1 M KOH, 90 mL H$_2$ can be collected within 5 minutes.

Importantly, the synthesis and engineering of the membrane-like catalyst can be scaled up. For a solar-driven electrolysis, a commercially available 20 W solar panel was used to perform the HER on a piece of HNDCM-100,000-1000/Co film as large as 10.5×3.5 cm$^2$ (FIG. 43), the maximum size limited by the carbonization oven. At a (non-regulated) output voltage of 20 V, an actual H$_2$ production rate of ~16 mL/min was achieved (FIG. 44). This result illustrates that the low-cost catalyst can meet the requirements for industrial H$_2$ production in a large, clean manner. It must be pointed out that OER is not only essential for water splitting, but also relevant for the charging process of rechargeable metal-air batteries (Oh et al., Nat. Chem. 4, 1004-1010 (2012)). The excellent OER activity in combination with devisable shapes of the membrane-like catalyst afford a new avenue to develop other efficient energy conversion devices. Furthermore, the electrocatalytic properties of HNDCM-based hybrids can be further optimized by choosing appropriate metal species.

Those in the art will understand that a number of variations may be made in the disclosed embodiments, all without departing from the scope of the invention, which is defined solely by the appended claims. Disclosed are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutations of these compounds may not be explicitly disclosed, each is specifically contemplated and described herein.

For example, if a method is disclosed and discussed and a number of modifications that can be made to a number of molecules including the method are discussed, each and every combination and permutation of the method, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A method of making a hierarchically structured, nitrogen-doped carbon membrane, the method comprising the steps of:
    (a) pouring onto a substrate a polymer solution comprising poly[1-cyanomethyl-3-vinylimidazolium bis(trifluoromethanesulfonyl) imide] (PCMVImTf$_2$N) and poly(acrylic acid) (PAA) in a dimethyl formamide solution to form a sheet;
    (b) drying the sheet to form a gradient porous polymer membrane;
    (c) contacting the gradient porous polymer membrane with an ammonium hydroxide aqueous solution; and
    (d) pyrolyzing the gradient porous polymer membrane of step (c) in the presence of nitrogen to form the hierarchically structured, nitrogen-doped carbon membrane.

2. The method of claim 1, wherein the drying step is performed at a temperature of 80° C. to 120° C.

3. The method of claim 1, wherein the drying step is performed for 1 to 20 hours.

4. The method of claim 1, wherein the molecular weight of the PAA is from 2,000 g/mol to 3,000,000 g/mol.

5. The method of claim 1, wherein the molecular weight of PCMVImTf$_2$N is from 22,000 g/mol to 100,000 g/mol.

6. The method of claim 1, further comprising contacting the gradient porous polymer membrane with a metallic salt aqueous solution comprising Co, Fe, Ni, Cr or Ge.

7. The method of claim 1, wherein the contacting step comprises soaking the gradient porous polymer membrane in the ammonium hydroxide for one to 36 hours.

8. The method of claim 1, wherein pyrolysis step is performed at a temperature of 500° C. to 1500° C.

9. The method of any of claim 1 further comprising:
    refluxing the gradient porous polymer membrane in an aqueous cobalt acetate solution for about 12 to about 36 hours; rinsing; and drying the refluxed gradient porous polymer membrane prior to the pyrolysis step; and phosphatizing the Co-containing membrane in the presence of monosodium phosphate ($NaH_2PO_4$) and nitrogen at a temperature of about 175° C. to about 525° C. to form a functionalized nanoporous carbon membrane comprising Co/CoP Janus-type nanocrystals after the pyrolysis step.

10. A nanoporous carbon membrane comprising:

a nitrogen-doped gradient porous polymer membrane with a hierarchical pore architecture, wherein the polymer comprises poly[1-cyanomethyl-3-vinylimidazolium bis(trifluoromethanesulfonyl) imide] ($PCMVImTf2N$) and poly(acrylic acid) (PAA) and wherein the pores are interconnected and gradually decrease in size from a first surface of the membrane to a second surface of the membrane.

11. The nanoporous carbon membrane of claim 10, further comprising a metal catalyst selected from the group consisting of Co, Fe, Ni, Cr, Ge.

12. The nanoporous carbon membrane of claim 10, wherein the membrane is functionalized with Co/CoP Janus nanocrystals.

13. A method of producing hydrogen comprising electrochemical splitting of water using a nanoporous carbon membrane comprising:

(a) nitrogen-doped gradient porous polymer membrane with a hierarchical pore architecture, wherein the polymer comprises poly[1-cyanomethyl-3-vinylimidazolium bis(trifluoromethanesulfonyl) imide] ($PCMVImTf_2N$) and poly(acrylic acid) (PAA) and wherein the pores are interconnected and gradually decrease in size from a first surface of the membrane to a second surface of the membrane; and (b) a single metal catalyst.

14. The method of claim 13, wherein the metal catalyst is cobalt.

15. The method of claim 13, wherein the electrochemical splitting of water occurs under alkaline conditions.

16. The method of claim 13, wherein the electrochemical splitting of water occurs under acidic conditions.

17. The method of claim 16, where in the membrane is functionalized with Co/CoP Janus nanocrystals.

18. The method of claim 1, any of claim 13, wherein electrochemical splitting of water comprises a hydrogen evolution reaction (HER).

19. The method of claim 18, wherein the electrochemical splitting of water further comprises an oxygen evolution reaction.

20. The method of claim 13, wherein the electrochemical splitting comprises:

(a) a hy1drogen evolution reaction; and (b) an oxygen evolution reaction.

* * * * *